(12) United States Patent
Atchison et al.

(10) Patent No.: US 11,041,301 B2
(45) Date of Patent: Jun. 22, 2021

(54) METHOD FOR INSTALLING A LIQUID QUALITY SYSTEM

(71) Applicant: ADVANCED DRAINAGE SYSTEMS, INC., Hilliard, OH (US)

(72) Inventors: Owen Michael Atchison, Van Buren, OH (US); Evan Joseph Geno, Malinta, OH (US); Graham Steven Michael Moore, Upper Sandusky, OH (US); Bryan Channing Stoops, Carey, OH (US); Bill Russel VanHoose, Powell, OH (US); Ronald R. Vitarelli, Marlborough, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 0 days.

(21) Appl. No.: 16/193,580

(22) Filed: Nov. 16, 2018

(65) Prior Publication Data
US 2019/0153718 A1    May 23, 2019

Related U.S. Application Data

(60) Provisional application No. 62/587,849, filed on Nov. 17, 2017.

(51) Int. Cl.
*E03F 5/14*  (2006.01)
(52) U.S. Cl.
CPC .................................... *E03F 5/14* (2013.01)
(58) Field of Classification Search
CPC combination set(s) only.
See application file for complete search history.

(56) References Cited

U.S. PATENT DOCUMENTS

| 6,780,310 B1 * | 8/2004 | Howe ................... B01D 17/00 |
| | | 210/155 |
| 10,639,568 B1 * | 5/2020 | Carter ....................... E03F 5/14 |
| 2006/0163130 A1 | 7/2006 | Happel |
| 2007/0012608 A1 | 1/2007 | Su |
| 2007/0023355 A1 | 2/2007 | Park |

(Continued)

OTHER PUBLICATIONS

PCT, Notification of Transmittal of the International Search Report and the Written Opinion of the International Searching Authority, or the Declaration, in International Application No. PCT/US18/61570, dated Jan. 19, 2019 (13 pages).

*Primary Examiner* — Jun S Yoo
(74) *Attorney, Agent, or Firm* — Finnegan, Henderson, Farabow, Garrett & Dunner LLP

(57) ABSTRACT

A method for installing a liquid quality system into a containment structure, wherein the liquid quality system includes a liquid quality device and at least one drag-inducing assembly, wherein the at least one drag-inducing assembly includes at least one supporting portion and at least one drag-inducing portion, wherein when the liquid quality device is installed a sump region is formed below, is provided. The method may include mounting, at least partially in the sump region, the at least one supporting portion onto a sidewall of the containment structure. The method may also include attaching the at least one drag-inducing portion to the at least one supporting portion. The method may also include mounting the liquid quality device in the containment structure.

18 Claims, 21 Drawing Sheets

(56) References Cited

U.S. PATENT DOCUMENTS

| | | | |
|---|---|---|---|
| 2011/0127204 A1* | 6/2011 | Andoh | E03F 5/0403 210/170.03 |
| 2018/0185770 A1* | 7/2018 | Garbon | B01D 21/2444 |
| 2018/0245327 A1 | 8/2018 | Babcanec | |

* cited by examiner

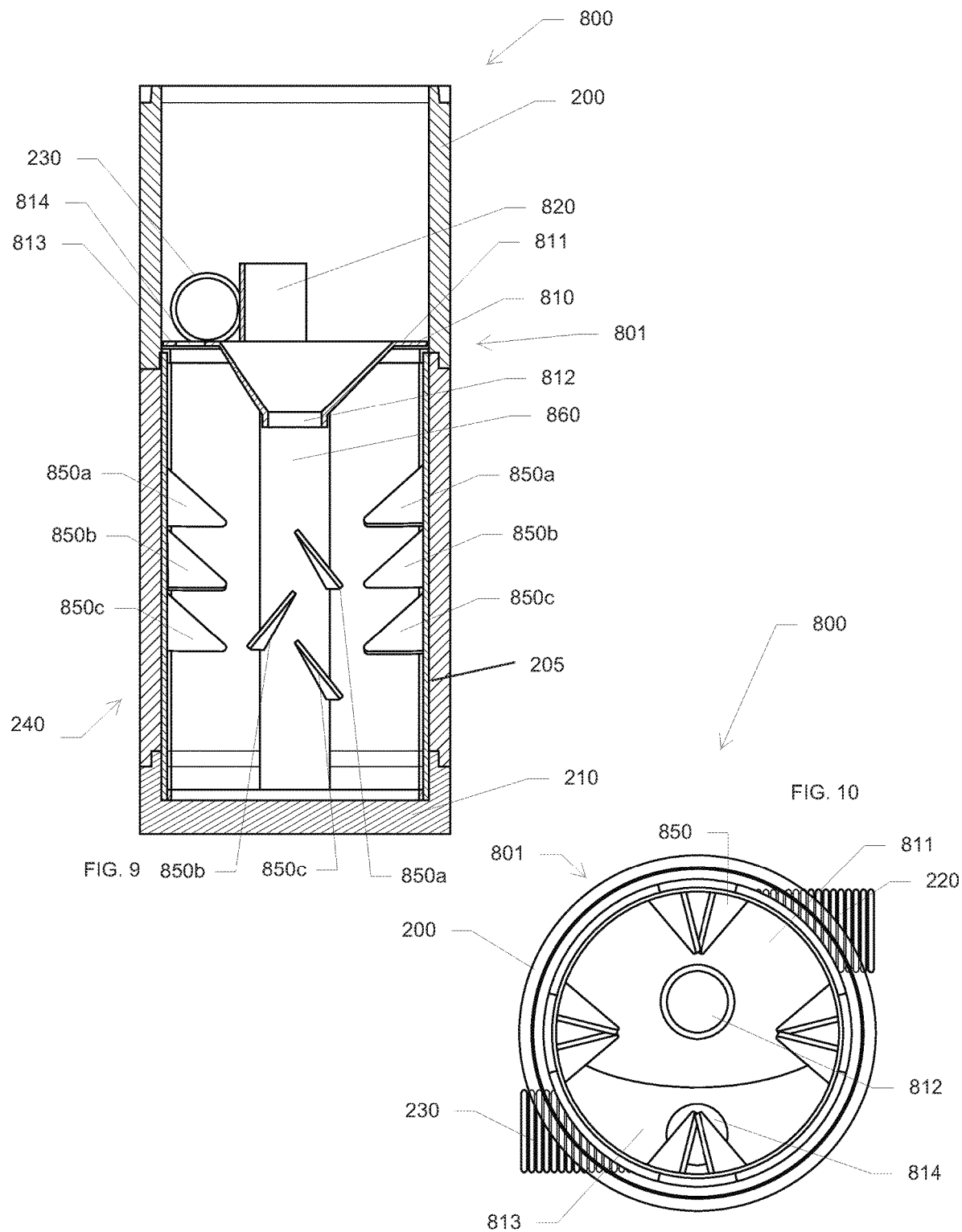

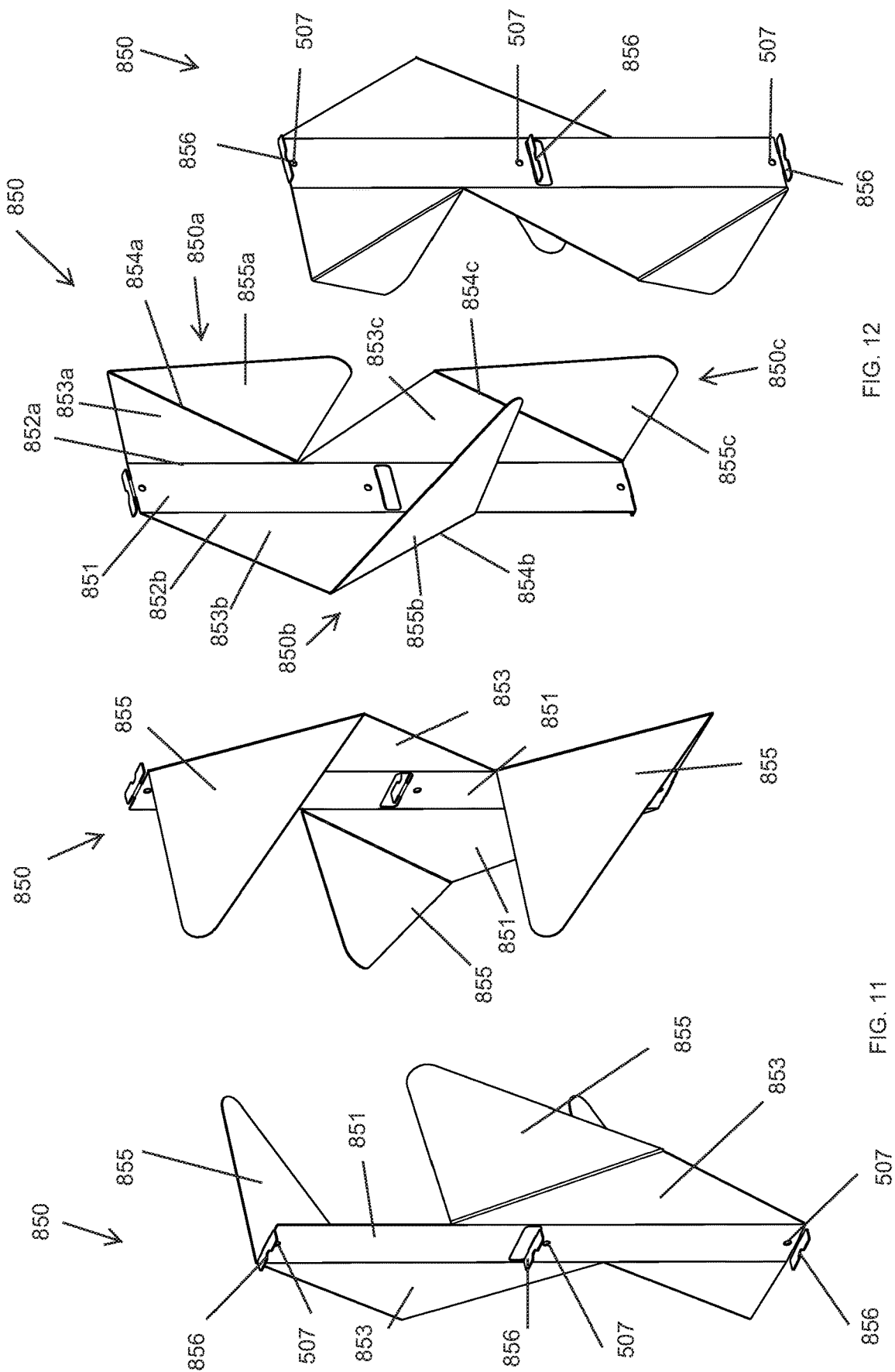

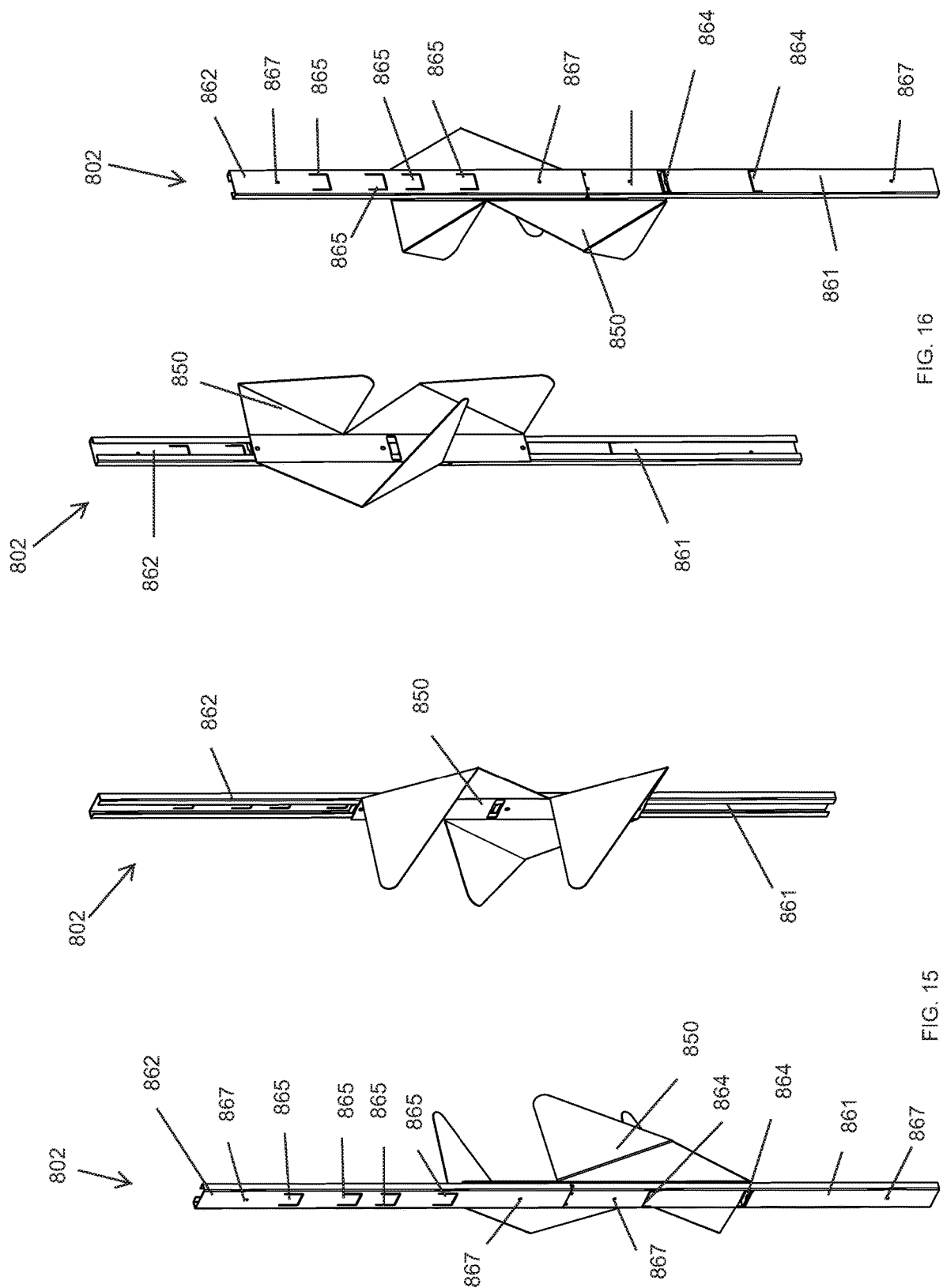

METHOD FOR INSTALLING A LIQUID QUALITY SYSTEM

CROSS REFERENCE TO RELATED APPLICATIONS

This application claims priority to U.S. Pat. Appl. Ser. No. 62/587,849 filed on Nov. 17, 2017, which is herein incorporated by reference in its entirety.

BACKGROUND

Generally, this application relates to a method for assembling a storm water runoff system for removing sediment, debris, pollutants, and/or total suspended solids (all or some of which can be herein referred to as "particulates") from a liquid, such as storm-water runoff.

Water runoff management (e.g., water generated by a rainfall) may be a challenging issue for landowners or municipalities. Not only does the flow of water have to be managed in order to reduce the risk of flooding, but particulates in the water should also be reduced, because such particulates reach rivers, ponds, lakes, or the ocean. Therefore, improved techniques of reducing particulates in water runoff are desired.

SUMMARY

According to certain inventive techniques, A method for installing a liquid quality system into a containment structure, wherein the liquid quality system includes a liquid quality device and at least one drag-inducing assembly, wherein the at least one drag-inducing assembly includes at least one supporting portion and at least one drag-inducing portion, wherein when the liquid quality device is installed a sump region is formed below, is disclosed. The method may include mounting, at least partially in the sump region, the at least one supporting portion onto a sidewall of the containment structure. The method may also include attaching the at least one drag-inducing portion to the at least one supporting portion. The method may further include mounting the liquid quality device in the containment structure.

In some embodiments, the at least one supporting portion may comprise a lower supporting portion and an upper supporting portion, and the lower supporting portion may be mounted onto the sidewall of the containment structure before the upper supporting portion is mounted onto the sidewall of the containment structure. In other embodiments, the lower supporting portion may include a lower region and an upper region, and the upper supporting portion may include a lower region and an upper region, and the method may further comprise: positioning the lower region of the lower supporting portion onto a base of the containment structure; and mounting the lower region of the upper supporting portion to the upper region of the lower supporting portion.

In some embodiments, the method may include attaching a cap including a flange to an upper region of the supporting portion; and positioning the liquid quality device onto the flange. The method may further include applying adhesive to secure the liquid quality device to the sidewall of the containment structure and the drag-inducing assembly.

In some embodiments, the at least one drag-inducing portion may comprise metal. In another embodiment, the at least one drag-inducing portion may comprise a plurality of drag-inducing portions constructed from a single piece of sheet metal. The method may further include: cutting the piece of sheet metal into a pattern comprising a plurality of arms; and bending each of the plurality of arms to from a plurality of drag-inducing portions. In some embodiments, the plurality of drag-inducing portions may comprise an inner bend, an inner arm portion, an outer bend, and an outer arm portion, wherein the inner bend and inner arm portion are proximate to a spine portion, and the outer bend and outer arm portion are distal from the spine portion.

In some embodiments, said attaching the at least one drag-inducing portion to the at least one supporting portion further may comprise sliding the at least one drag-inducing portion along the supporting portion until the at least one drag-inducing portion contacts a stopping portion and is locked in place by a locking portion, thereby placing the at least one drag-inducing portion into a predetermined position.

According to certain inventive techniques, A method for installing a liquid quality system into a containment structure, wherein the liquid quality system includes a liquid quality device and plurality of drag-inducing assemblies, wherein the plurality of drag-inducing assemblies includes at least one supporting portion and at least one drag-inducing portion, wherein when the liquid quality device is installed a sump region is formed below, is disclosed. The method may include mounting, at least partially in the sump region, the at least one supporting portion of each of the plurality of drag-inducing assemblies onto a sidewall of the containment structure. The method may also include, attaching the at least one drag-inducing portion of each of the plurality of drag-inducing assemblies to the at least one supporting portion. The method may further include mounting the liquid quality device in the containment structure.

In some embodiments, the at least one supporting portion may comprise a lower supporting portion and an upper supporting portion, and the lower supporting portion may be mounted onto the sidewall of the containment structure before the upper supporting portion is mounted onto the sidewall of the containment structure. In other embodiments, the lower supporting portion may include a lower region and an upper region, and the upper supporting portion may include a lower region and an upper region, and the method may further comprise: positioning the lower region of the lower supporting portion onto a base of the containment structure; and mounting the lower region of the upper supporting portion to the upper region of the lower supporting portion.

In some embodiments, the method may include attaching a cap including a flange to an upper region of the supporting portion; and positioning the liquid quality device onto the flange. The method may further include applying adhesive to secure the liquid quality device to the sidewall of the containment structure and the drag-inducing assembly.

In some embodiments, the at least one drag-inducing portion may comprise metal. In another embodiment, the at least one drag-inducing portion may comprise a plurality of drag-inducing portions made from a single piece of sheet metal. The method may further comprise cutting the piece of sheet metal into a pattern comprising a plurality of arms; and bending each of the plurality of arms to from a plurality of drag-inducing portions. In some embodiments, the plurality drag-inducing portions may comprise an inner bend, an inner arm portion, an outer bend, and an outer arm portion, wherein the inner bend and inner arm portion are proximate to a spine portion, and the outer bend and outer arm portion are distal from the spine portion.

In some embodiments, said attaching the at least one drag-inducing portion of each of the plurality of drag-inducing assemblies to the at least one supporting portion may comprise sliding the at least one drag-inducing portion along the supporting portion until the at least one drag-inducing portion contacts a stopping portion and is locked in place by a locking portion, thereby placing the at least one drag-inducing portion into a predetermined position.

BRIEF DESCRIPTION OF SEVERAL VIEWS OF THE DRAWINGS

FIG. 9 illustrates a cross-sectional view of the liquid quality system including a plurality of drag-inducing portions taken along line 9-9 in FIG. 8, according to certain inventive techniques.

FIG. 10 illustrates a bottom-plan view of the liquid quality system including a plurality of drag-inducing portions according to certain inventive techniques.

FIG. 11 illustrates perspective views of a plurality of drag-inducing portions according to certain inventive techniques.

FIG. 12 illustrates perspective views of a plurality of drag-inducing portions according to certain inventive techniques.

FIG. 15 illustrates perspectives view of a plurality of drag-inducing portions attached to a supporting portion according to certain inventive techniques.

FIG. 16 illustrates perspective views of a plurality of drag-inducing portions attached to a supporting portion according to certain inventive techniques.

Figure 1:
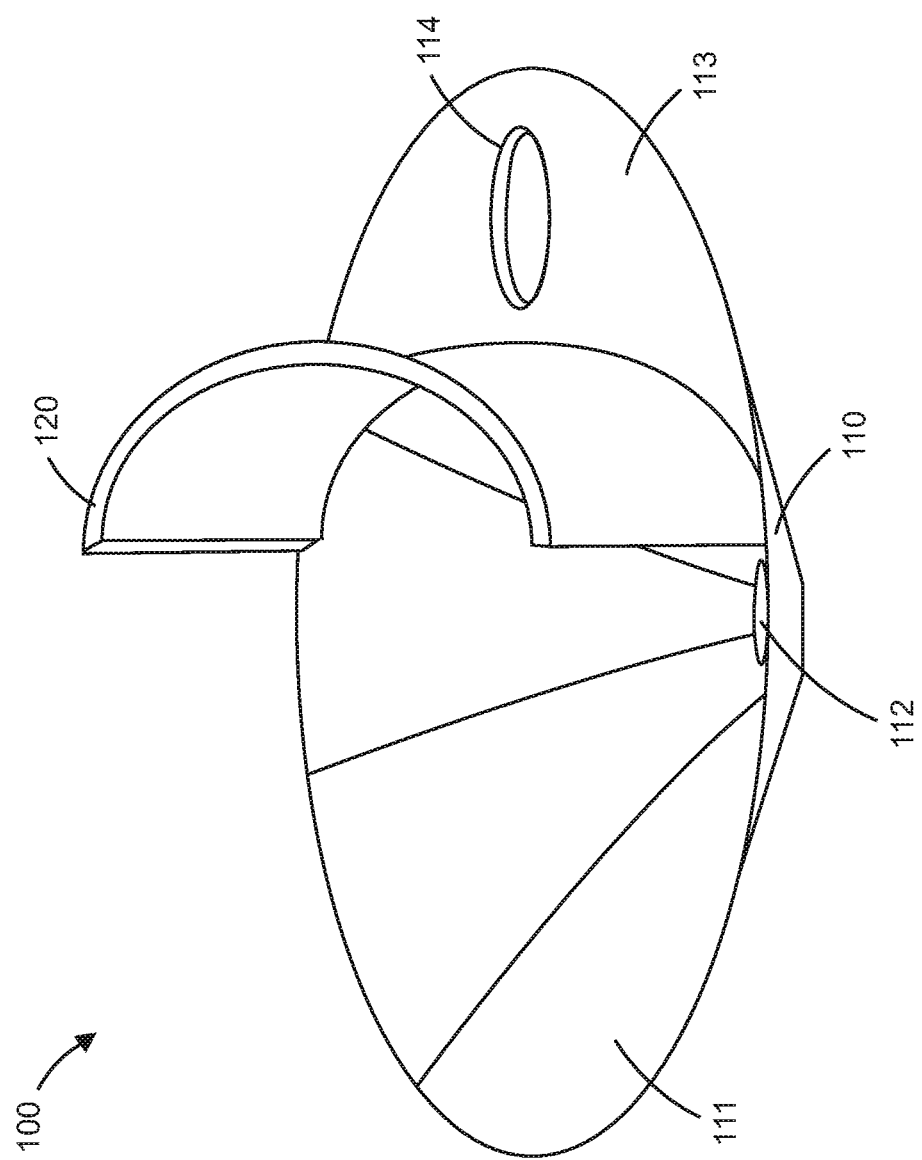
FIG. 1 illustrates a perspective view of liquid quality device, according to certain inventive techniques.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

Parts Listing

| Number | Description |
|---|---|
| 100 | liquid quality device |
| 110 | partitioning portion |
| 111 | first region |
| 112 | sump inlet aperture |
| 113 | second region |
| 114 | sump outlet aperture |
| 120 | weir |
| 200 | containment structure |
| 205 | sidewall |
| 210 | base |
| 220 | inlet |
| 230 | outlet |
| 240 | sump region |
| 500 | pattern blank |
| 501 | spine |
| 502 | inner bending line |
| 503 | arm |
| 502a | first inner bending line |

-continued

| Number | Description |
| --- | --- |
| 502b | second inner bending line |
| 504 | outer bending line |
| 504a | first outer bending line |
| 504b | second outer bending line |
| 504c | third outer bending line |
| 506 | t-shaped pattern |
| 507 | aperture |
| 700 | liquid quality device |
| 710 | partitioning portion |
| 711 | first region |
| 712 | sump inlet aperture |
| 713 | second region |
| 714 | sump outlet aperture |
| 720 | weir |
| 721 | aperture |
| 730 | clean-out riser |
| 800 | liquid quality system |
| 801 | liquid quality device |
| 802 | drag-inducing assembly |
| 810 | partitioning portion |
| 811 | first region |
| 812 | sump inlet aperture |
| 813 | second region |
| 814 | sump outlet aperture |
| 820 | weir |
| 850 | drag-inducing portion |
| 850a | first drag-inducing portion |
| 850b | second drag-inducing portion |
| 850c | third drag-inducing portion |
| 851 | spine |
| 852 | inner bend |
| 852a | first inner bend |
| 852b | second inner bend |
| 853 | inner arm portion |
| 853a | first inner arm portion |
| 853b | second inner arm portion |
| 853c | third inner arm portion |
| 854 | outer bend |
| 854a | first outer bend |
| 854b | second outer bend |
| 854c | third outer bend |
| 855 | outer arm portion |
| 855a | first outer bend |
| 855b | second outer bend |
| 855c | third outer bend |
| 856 | t-shaped connecting portion |
| 860 | supporting portion |
| 860a | first supporting portion |
| 860b | second supporting portion |
| 860c | third supporting portion |
| 860d | fourth supporting portion |
| 861 | lower supporting portion |
| 862 | upper supporting portion |
| 863 | fastener |
| 864 | stopping portion |
| 865 | locking portion |
| 866 | cap |
| 867 | aperture |
| 868 | flange |

A liquid quality system may be used to reduce particulates in liquid runoff (e.g., storm-water runoff). Some liquid quality system may induce a vortex in the liquid, causing suspended particulates to settle on the outside of the vortex, thereby separating the liquid from the particulates. However, if the velocity of the vortex is too great, the liquid flow may be very turbulent. Moreover, if the velocity of liquid flow is too great in the vortex, the settled particulates may be mixed back up into the liquid (resuspension). The combination of turbulence and resuspension may thus reduce the effectiveness of the liquid quality device.

According to the techniques disclosed herein, an inventive liquid quality system may be better adapted to remove particulates by reducing the speed of the vortex and creating a long laminar liquid flow path. By forcing smooth direction changes in the flow path and directing the liquid flow away from the outlet, the overall length of the flow path may increase. Additionally, by subjecting the vortex to drag, the velocities within the vortex may decrease. These techniques may improve the effectiveness of the liquid quality device, and will be described in greater detail below.

FIG. 1 illustrates a perspective view of a liquid quality device 100, according to certain inventive techniques. The liquid quality device 100 includes a partitioning portion 110 and a weir 120. The partitioning portion 110 may have a first region 111 and a second region 113, which may be separated by the weir 120. The partitioning portion 110 may be one integrated piece, or formed from separate pieces (e.g., the first region 111, the second region 113, the funnel (e.g., vortex-inducing region), etc.) The partitioning portion 110 and/or the weir 120 may include a material such as polyethylene or polypropylene. The partitioning portion 110 and weir 120 may be one integrated piece or may be separate pieces.

The weir 120 may completely (or partially) separate the first region 111 from the second region 113. As can be seen, the weir 120 may have a curvature along a horizontal dimension, and this curvature may be concave when viewed from the first region 111. The curvature may be constant, or may have a curve with a varying radius as shown. For example, the depicted curvature has shorter radiuses at the edges and one or more longer radiuses in the center. Such a varying-radius design may facilitate the creation of a relatively smooth transition between the weir 120 and the sidewall of a tubular portion (e.g., a containment structure) in which the liquid quality device 100 is inserted (the "tubular portion" is discussed below). Tubular means to have a cross-sectional profile that can be round, oval, square, hexagonal, octagonal, or other some other shape. Such a varying curvature may assist in reducing turbulence (which may negatively impact the efficiency of the liquid quality device 100 to remove particulates). Alternatively, there may be no curvature, or there may be convex curvature in the weir 120, as viewed from the first region 111.

The first region 111 may include a funnel (vortex-inducing region) and a sump inlet aperture 112 as depicted in FIG. 1. The funnel may be designed to increase the length of time that the flow remains in the funnel and thus in a vortex. That in conjunction with the decreasing radius helps to maximize particulate separation. The second region 113 may include a sump outlet aperture 114. The second region 113 may have a generally flat profile in the horizontal dimension.

The size of the apertures 112 and/or 114 may be determined by using the following equation:

$$Q = C_d A \sqrt{2gh}$$

Where Q=flow rate in cubic feet per second;
$C_d$=is the coefficient of discharge;
A=area of the aperture in square feet;
g=is the acceleration of gravity (32.2 ft./second$^2$); and
h=the head in feet acting on the aperture.

Figure 2:
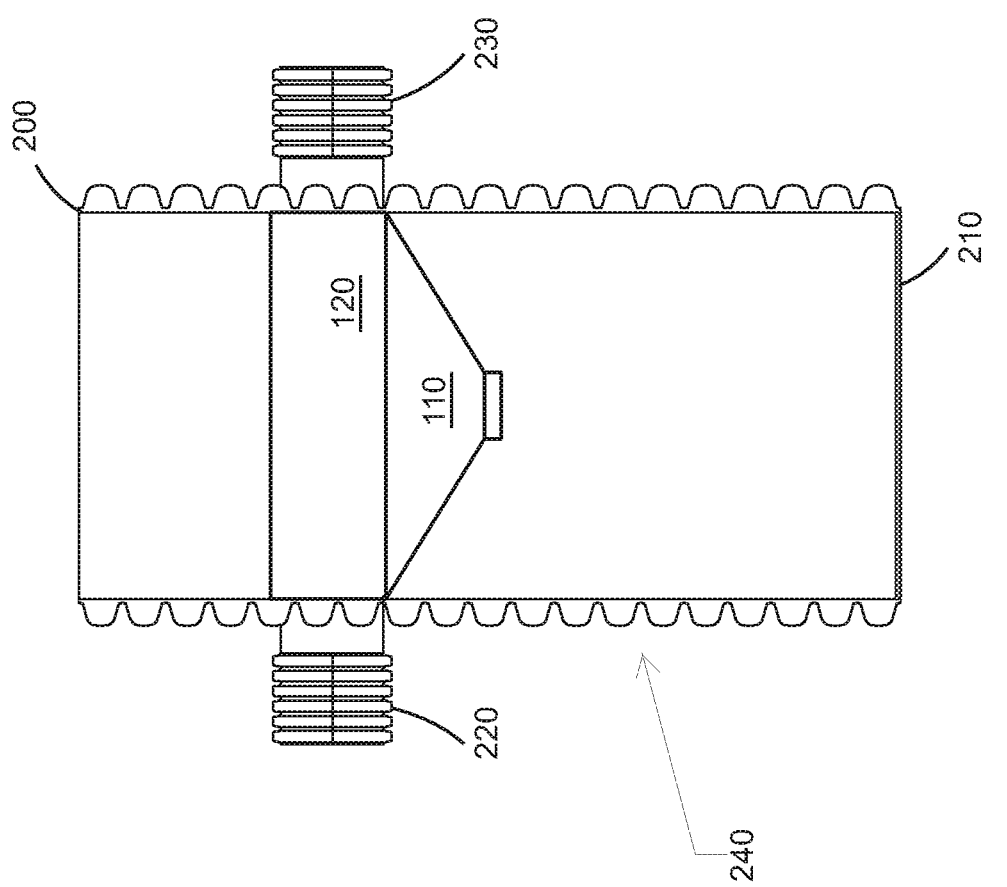
FIG. 2 illustrates an elevational view, partially cross-sectioned, of a liquid quality device in a containment structure, according to certain inventive techniques.

FIG. 2 illustrates an elevational view, partially cross-sectioned, of the liquid quality device 100 in a containment structure 200 (e.g., a manhole), according to certain inventive techniques. The containment structure 200 may include a base 210, an inlet 220, and an outlet 230. Any one of the base 210, the inlet 220, and/or the outlet 230 may be integrated into the body of the containment structure 200, or they may be separate pieces that work or connect together to achieve the functions described herein.

The area between the liquid quality device 100 and the base 210 may be a sump region 240. As will be described in further detail with respect to FIG. 5, liquid may flow into the containment structure 200 through the inlet 220 and then into the sump region 240, thereby passing through the liquid quality device 100. The liquid may exit the sump region 240 through the liquid quality device 100 and then exit the containment structure 200 through the outlet 230.

Figure 3:
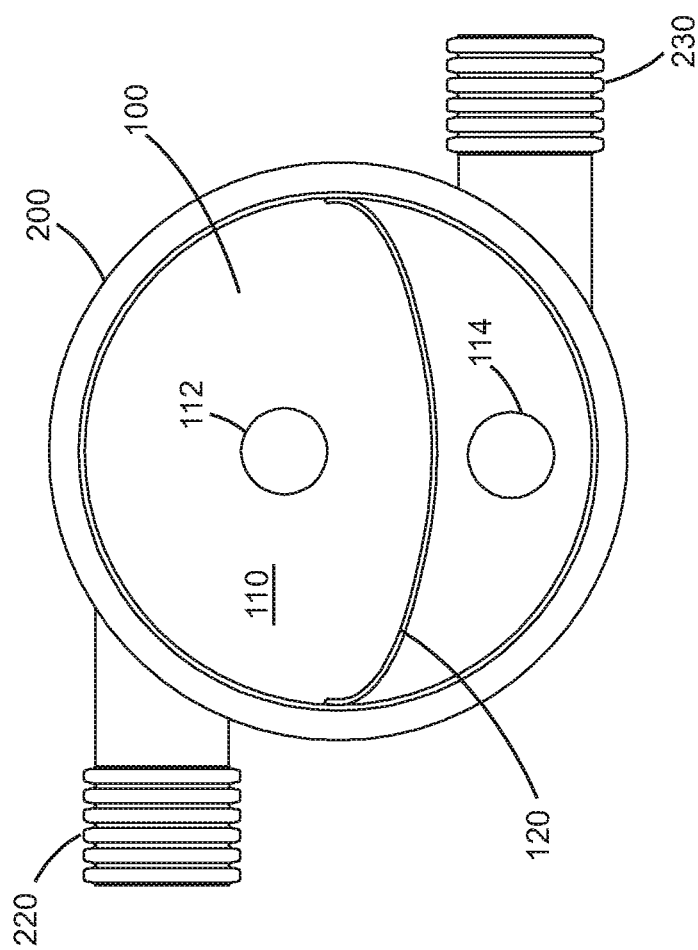
FIG. 3 illustrates a top view of a liquid quality device in a containment structure with an inline arrangement, according to certain inventive techniques.
Figure 4:
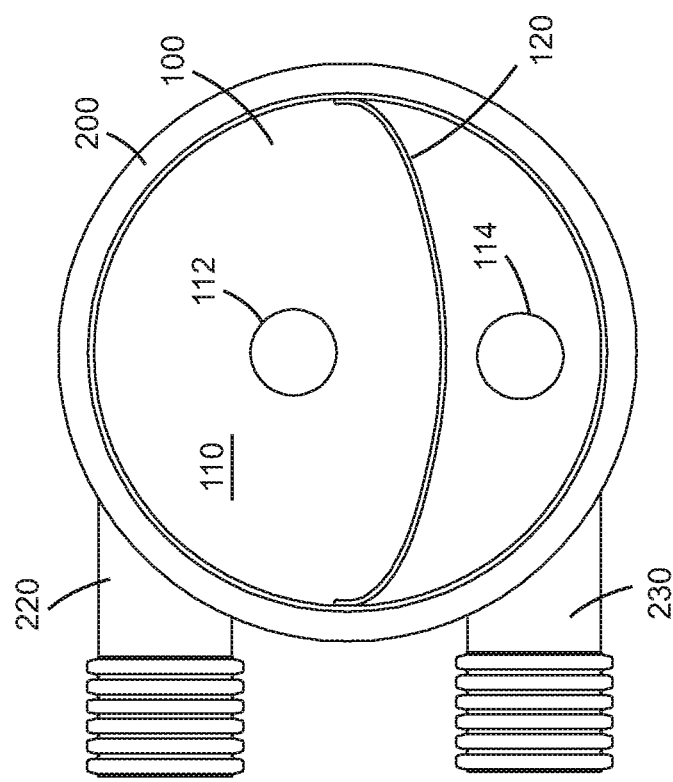
FIG. 4 illustrates a top view of a liquid quality device in a containment structure with an offline arrangement, according to certain inventive techniques.

FIG. 3 illustrates a top view of the liquid quality device 100 in the containment structure 200 with an inline arrangement of the inlet 220 and outlet 230, according to certain inventive techniques. In this arrangement, liquid enters the containment structure 200 on one side through the inlet 220 and exits on the other side through the outlet 230. FIG. 4 illustrates an offline arrangement, where liquid enters and exits on the same side of the containment structure 200. Other arrangements are possible, such as liquid entering and exiting the containment structure 200 at right angles or oblique angles.

Figure 5A:
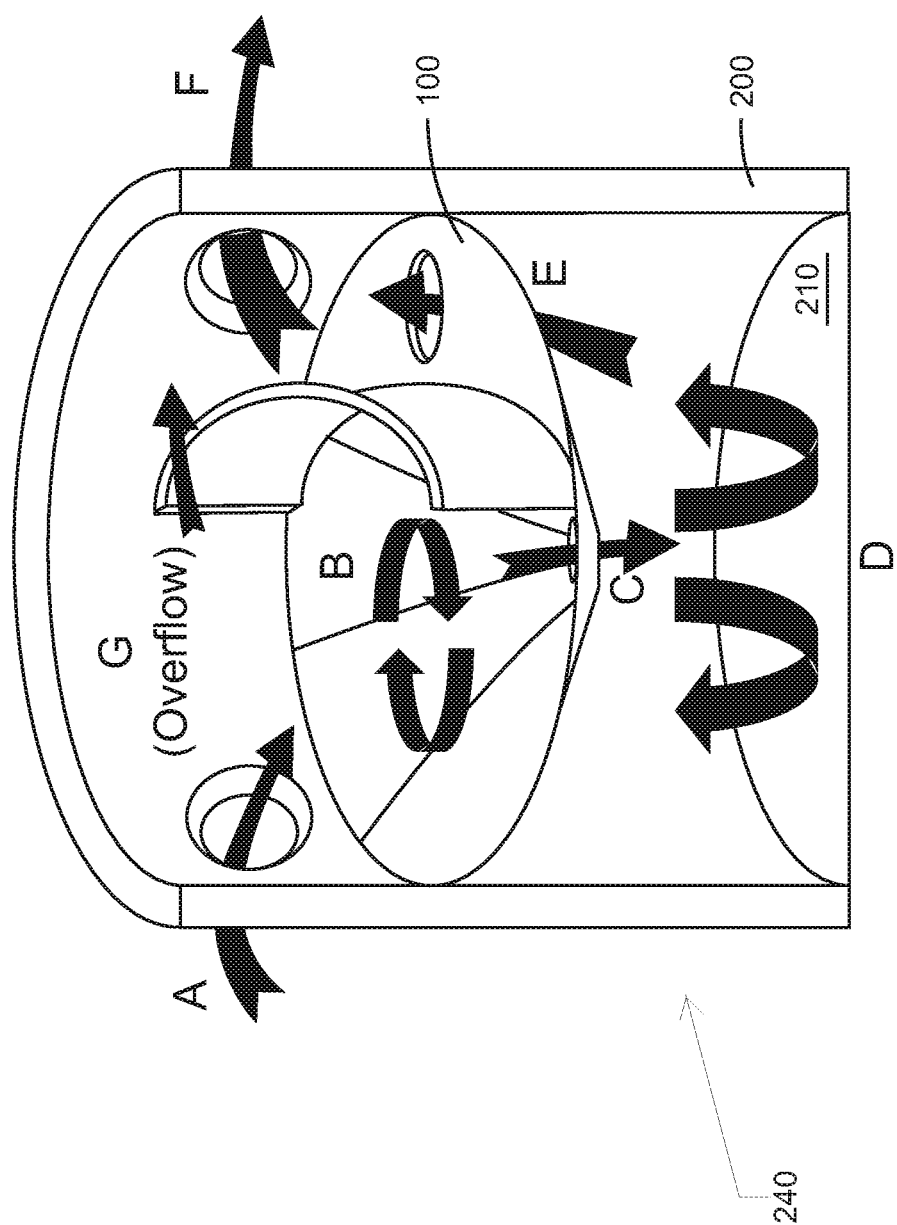
FIG. 5A illustrates a sequence showing how fluid flows through a liquid quality device in a containment structure, according to certain inventive techniques.

FIG. 5A illustrates a sequence showing how liquid flows through the liquid quality device 100 in the containment structure 200, according to certain inventive techniques. At step A, liquid (which has suspended particulates) may enter the containment structure 200 through the inlet 220. The liquid enters the containment structure 200 at a location above the liquid quality device 100, and more particularly above the first region 111. During lower liquid volume flow (e.g., the first flush), the liquid is inhibited from flowing into the second region 113 by the weir 120.

At step B, the funnel of the liquid quality device 100 together with the weir 120 induces the liquid into a vortex. At step C, the liquid passes through the liquid quality device 100 via sump inlet aperture 112 and into the sump region 240 (e.g., the area in the containment structure 200 between the liquid quality device 100 and the base 210). At step D, the liquid propagates into the sump region 240 in the general direction shown by the arrows. Once the liquid passes into the sump region 240, the vortex action may be reduced through detention time and energy losses. This may allow smaller pollutants that were not removed through the cyclonic action of the vortex in the funnel to settle out of the liquid.

At step E, the liquid exits the sump region 240 through the sump outlet aperture 113. The liquid is now above the second region 113, and the weir 120 inhibits the liquid from flowing back into the first region 111. At step F, the liquid exits the containment structure 200 through outlet 230.

As the liquid level above the first region 111 rises, it will begin to, at step G, overtop the weir 120 and flow into an area above the second region 113. This liquid then exits the containment structure 200 through the outlet 230, thereby bypassing the vortex-inducing steps. The overflowing liquid does not pass through the sump region 240, and therefore treatment is bypassed. By allowing a portion of the increased liquid flow to avoid the treatment area in the sump region 240, liquid flow velocities in the sump region 240 will be reduced. Consequently, there will be less of a problem with settled particulates being mixed back up with the liquid.

After the event, the settled particulates can be cleaned out through either the sump inlet aperture 112, the sump outlet aperture 114, or an additional aperture (not shown) in the liquid quality device 100. For example, a tube can be inserted through one or more of these apertures, and a vacuum can be applied through the tube.

Figure 5B:
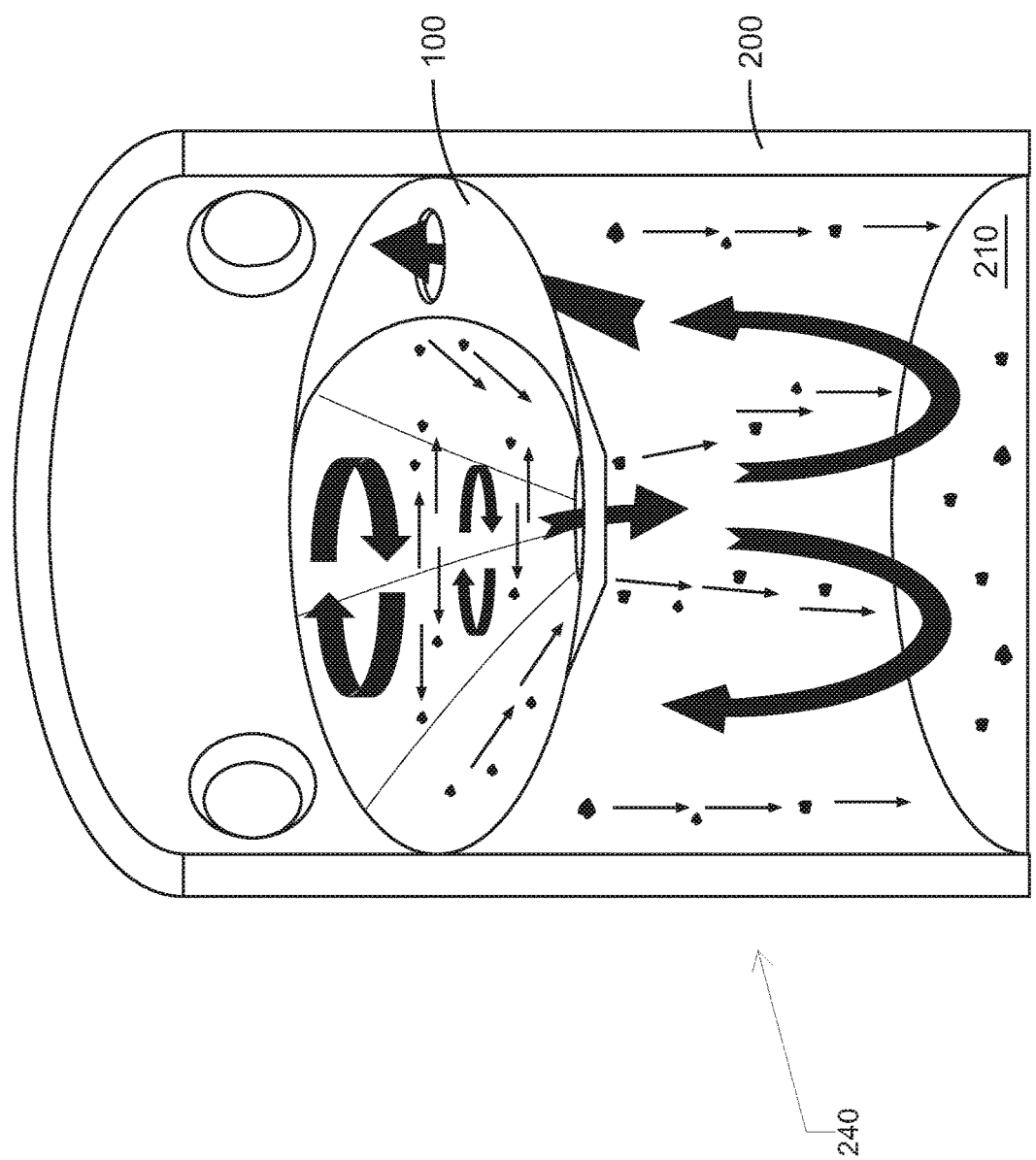
FIG. 5B illustrates a sequence showing how particulates are separated from a liquid by use of a liquid quality device in a containment structure, according to certain inventive techniques.

FIG. 5B illustrates a sequence showing how particulates are separated from a liquid by use of the liquid quality device 100 (depicted without the weir 120 for clarity in the illustration) in the containment structure 200, according to certain inventive techniques. As depicted, a vortex formed in the funnel region of the liquid quality device 100 pushes some of the relatively heavier particulates to the edges of the vortex (near the sides of the funnel) via a centrifugal force. These particles will then drop through the sump inlet aperture 112 into the sump region 240, landing on the base 210.

Relatively lighter particulates will enter the sump region 240 and be carried upwards by the liquid flow. As these particulates are carried upward in the sump region 240, the liquid flow loses velocity. This allows these relatively lighter particulates to fall out of the liquid flow and onto the bottom of the sump region 240.

Figure 6B:
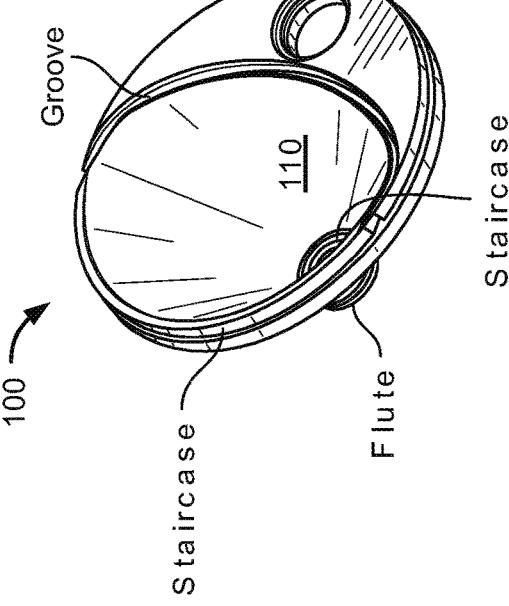
FIG. 6B illustrates a perspective and exploded view of a liquid quality device, according to certain inventive techniques.
Figure 6A:
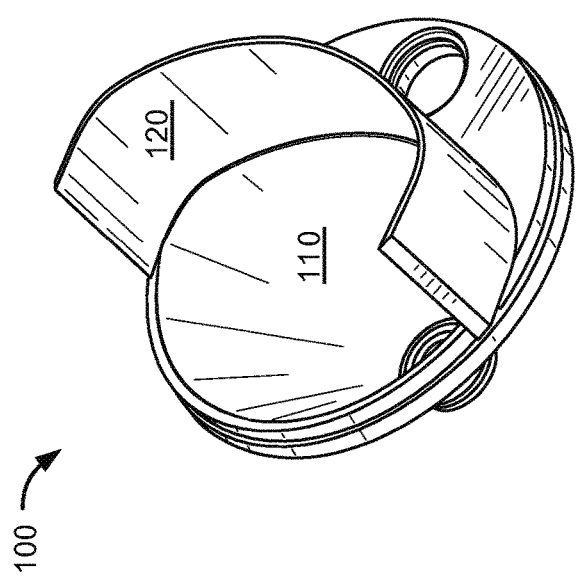
FIG. 6A illustrates a perspective view of a liquid quality device, according to certain inventive techniques.
Figure 6C:
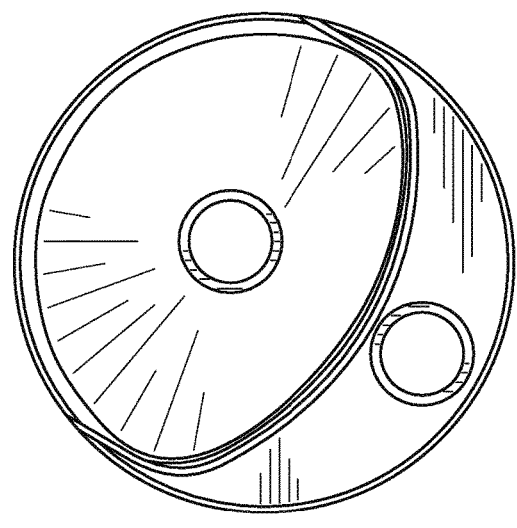
FIG. 6C illustrates a top view of a liquid quality device, according to certain inventive techniques.
Figure 6D:
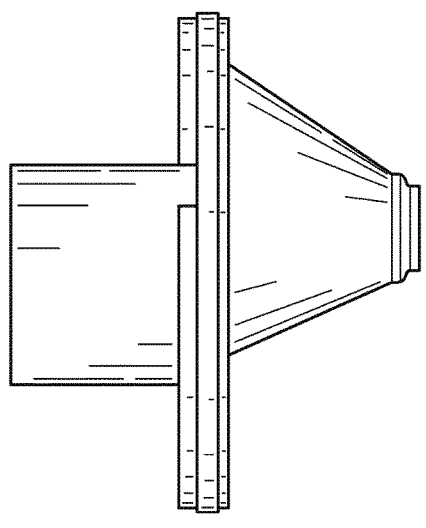
FIG. 6D illustrates an elevational view of a liquid quality device, according to certain inventive techniques.

FIGS. 6A-6D illustrate additional detail of optional details and/or features for the liquid quality device 100, according to certain inventive techniques. FIG. 6A illustrates a perspective view of the liquid quality device 100. FIG. 6B depicts an exploded view of the device 100. FIG. 6C shows a top view of the device. FIG. 6D illustrates an elevational view of the device 100.

With reference particularly to FIG. 6B, it can be seen that the partitioning portion 110 may have a groove sized and shaped to receive the weir 120. The grove may allow for proper and consistent placement of the weir 120 and may facilitate the weir 120 to be attached to the partitioning portion 110 through welding or fastening. The outer rim of the partitioning portion 110 may have a staircase profile with two or more levels, whereby the lower level(s) have larger radiuses than the higher level(s). This design may allow for convenient modifications for treatment flow rates by providing guides for different aperture sizes. Each of the sump inlet aperture 112 and/or sump outlet aperture 114 may also have a staircase profile with two or more levels, whereby a lower level of a given aperture may be narrower than an upper level. This allows for simple modifications for treatment flow rates by providing guides for different aperture sizes. The sump inlet aperture 112 also may have a flute (see FIG. 6D for a fuller profile of the flute) that extends downwardly from the funnel of the partitioning portion 110.

Exemplary dimensions of the liquid quality device 100 are as follows. The partitioning portion 110 may have an outer diameter of approximately 47". The weir 120 may have a height of approximately 16". The widest diameter of the funnel along the longest horizontal axis may be approximately 34.39". The height of the funnel may be approximately 23.25". The groove may be approximately 2" deep.

The smallest level of the staircase profile in the sump inlet aperture 112 may be approximately 8" in diameter. The widest aperture of the sump inlet aperture 112 may be approximately 10" in diameter. Similarly, the smallest level of the staircase profile in the sump outlet aperture 114 may be approximately 8" in diameter, while the widest may be approximately 10" in diameter. It may be possible to choose which size apertures 112, 114 are to be used on site or in a factory or facility. For example, narrow apertures (e.g., 8" apertures) may be used for relatively lower flow applications (e.g., 0.6 cubic feet per second). Optionally, the narrower levels (e.g., 8" apertures) the may be removed, thereby leaving a wider levels (e.g., 10" apertures). The wider apertures may be used for relatively higher flow applications (e.g., 1.0 cubic feet per second). The narrower level(s) may be removed with a knife or saw, thereby leaving the wider level(s).

The liquid quality device 100 may not have different levels. It may be manufactured to have different dimensions (e.g., different aperture 112, 114 sizes) in accordance with the principles discussed above.

Figure 7:
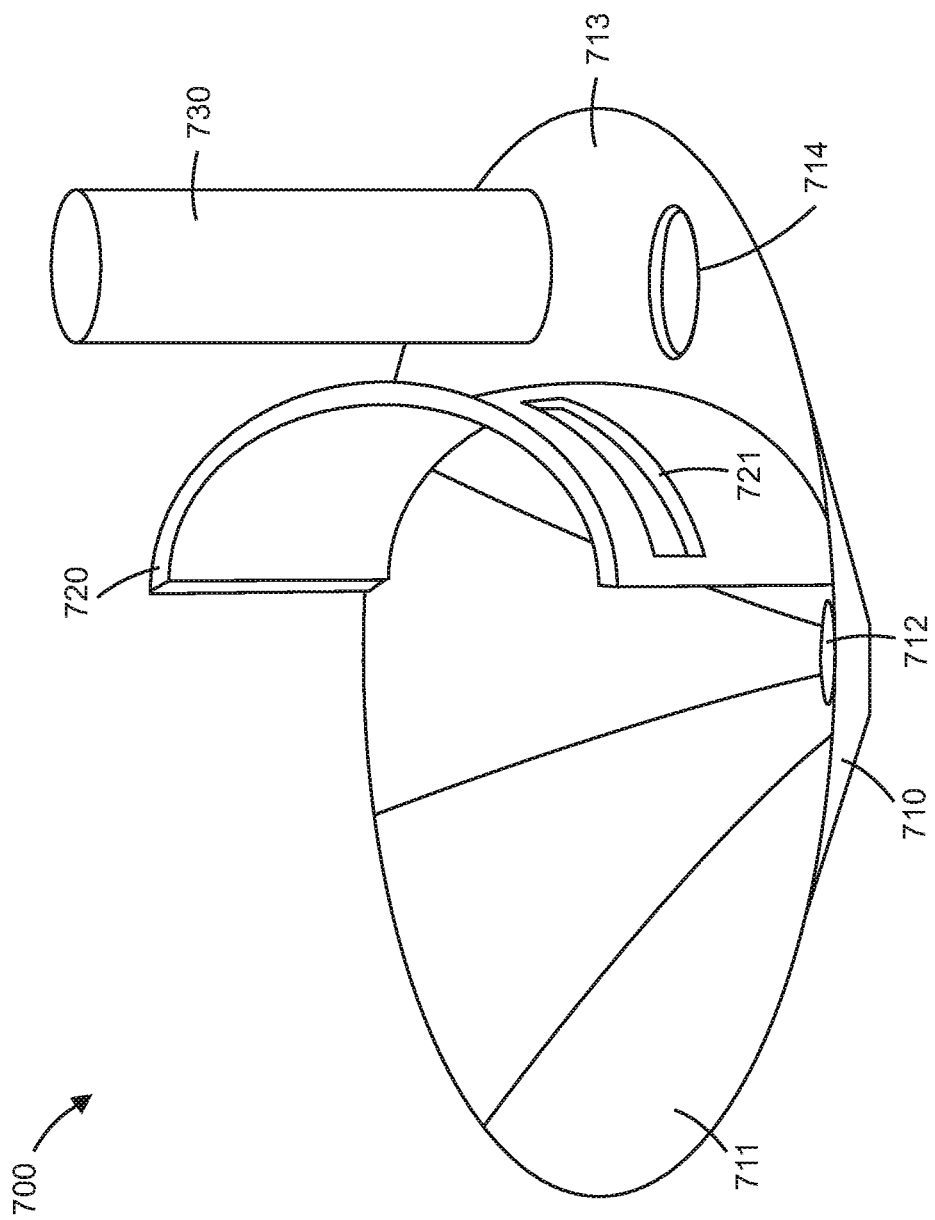
FIG. 7 illustrates a liquid quality device, according to certain inventive techniques.

FIG. 7 illustrates a liquid quality device 700 with an alternative design and/or optional features, according to certain inventive techniques. Similar to the one described above, the liquid quality device includes a partitioning portion 710 and a weir 720. The partitioning portion 710 may have a first region 711 and a second region 713, which may be separated by the weir 720. The weir 720 may completely (or partially) separate the first region 711 from the second region 713. The first region 711 may include a funnel and a sump inlet aperture 712 as depicted in FIG. 7. The second region 713 may include a sump outlet aperture 714. The second region 713 may have a generally flat profile in the horizontal dimension.

The liquid quality device 700 may also include a cleanout riser 730 that extends upwardly from an additional aperture (not visible in the figure because it is underneath the riser 730, but may be termed a sump access aperture) in the second region 713. A vacuum may be applied to the cleanout riser 730 to remove settled particulates from the sump region 240.

The weir 720 may also have an aperture 721 (e.g., having a rectangular shape). The aperture size and location may be selected to allow an increased flow rate that falls between the design treatment rate and ultimate flow rate (approximately 3× the treatment flow rate) to pass through the aperture 721 without overtopping the entire weir 720. The design treatment rate may be the flow rate of liquid that is intended to pass through the unit and receive treatment for the removal of particulates. The ultimate flow rate may be the total flow rate of the liquid that can pass through the unit (rate that receives treatment and rate that overtops the weir combined) without overflowing from the tubular structure. By not overtopping the weir 720, this may assist in containment of large debris and force it into the sump region 240.

As the flow rates in the liquid quality device 700 approach the ultimate flow rate (again, approximately 3× the treatment flow rate) the additional liquid volume will overtop the weir 720 and exit the device 700. As this point the influent is typically considered to have substantially reduced levels of particulates, and therefore in no need for treatment. By allowing the flows to overtop the weir 720, this also helps reduce velocities in the sump region 240 which in turn helps to reduce the re-suspension of the previously collected particulates.

FIGS. 8-12 illustrate a liquid quality system 800 with an alternative design and/or optional features, according to certain inventive techniques. The liquid quality system 800 may include a liquid quality device 801, similar to the ones described above. The liquid quality device 801 may generally comprise, as described above, a partitioning portion 810 and a weir 820. The partitioning portion 810 may have a first region 811 and a second region 813, which may be separated by the weir 820. The liquid quality system may include containment structure 200, which may include a base 210, an inlet 220, and an outlet 230. Any one of the base 210, the inlet 220, and/or the outlet 230 may be integrated into the body of the containment structure 200, or they may be separate pieces that work or connect together to achieve the functions described herein. The liquid quality device 801 may be positioned in a containment structure 200.

The liquid quality system 800 may have a vertical central vertical axis (not shown), that runs the primary (longer) length of the system, including through the sump region 240, where a primary axial dimension runs parallel to, or along the central axis. The liquid quality system 800 may also include at least one drag-inducing portion(s) 850 and at least one supporting portion(s) 860.

As discussed above, inducing a vortex in the liquid within a liquid quality system 800, may assist in removing particulates from the liquid. However, if the liquid flow velocity and/or turbulence in the vortex in the sump region 240 are too great, the settled particulates may be mixed back up into the liquid, thus reducing the effectiveness of the liquid quality system. The introduction of drag-inducing portion(s) 850 may assist in reducing the liquid flow velocity and/or turbulence in vortex in the sump region 240.

The drag-inducing portion(s) 850 may require a certain flow-rate to begin affecting the flow of the liquid in the sump region 240. At lower flow rates the funnel may create a vortex in first region 811, causing liquid to flow through the sump inlet orifice 812 and shoot straight down into the sump region 240. As the flow rate increases, so does the rotational energy of the liquid. Thus, at higher flow rates, the vortex induced by the funnel in the first region 811 may have enough rotational energy to create a vortex in the sump region 240 after the water passes through the sump inlet orifice 812. Such a vortex in the sump region 240 may have strong turbulence. The liquid flow velocity and/or the turbulence of the vortex in the sump region 240 may increase as the flow rate increases.

By controlling the liquid flow velocities and/or vortex in the sump region 240, the filtering of particulates may be positively affected. As a result of a relatively high flow rate, the turbulent vortex may pick up already settled particulates from the floor of the sump region 240. Thus, one aspect of the present disclosure is to reduce such resuspension, also called "scour effect," of settled particulates in the sump region 240 by transforming the turbulent flow of the vortex into a controlled and increasingly laminar flow.

Aside from a relatively high liquid flow velocity, liquid turbulence within the vortex may affect the behavior of the liquid flow and may also influence the settling characteristics of particulates in the flow. Generally, the greater the liquid turbulence and liquid flow velocity in the sump region 240, the more difficult it may be for particulates to settle, and the easier it may be for resuspension of particles to occur. Therefore, it may be desirable to create a longer, more laminar flow path to increase the amount of time which liquid remains in the sump region 240, thereby providing sufficient time for particulates to settle at the base 210 of the sump region 240. Thus, a second aspect of the present disclosure is to ensure optimal settling of particulates by creating a longer, more laminar flow path in the sump region 240. One way to create a longer, more laminar flow path may be to force the liquid to make smooth direction changes as it moves around the sump region 240 in the vortex. Another technique may guide the liquid away from the sump outlet aperture 814 to increase the amount of time that liquid remains in the sump region 240.

For example, once a vortex is formed in the sump region 240, one way to force smooth direction changes and guide the liquid flow away from the sump outlet aperture 814 is to position at least one drag-inducing portion(s) 850, which projects inwardly towards the central axis, proximate a sidewall 205 of containment structure 200 in the sump region 240. Proximate a sidewall 205 means proximate to or on the side wall of the tubular portion of the containment structure 200 in the sump region 240. Projecting inwardly towards the central axis means projecting, at least partially, towards the central axis. The drag-inducing portion(s) 850 may have several effects on liquid that passes over it including: creating drag to slow the liquid flow velocities in the vortex; extending the flow path by forcing a smooth direction change; and/or guiding liquid away from the sump outlet aperture 814. The orientation and angle of the drag-inducing portion(s) 850, as will be discussed in more detail below, may be chosen to achieve an enhanced settling efficiency. The impact of the drag-inducing portion(s) 850 may increase as the flow rate increases.

The drag-inducing portion(s) 850 may have a solid or hollow body, and may displace some volume of the liquid in the sump region 240. Thus, when liquid flow passes by the body of the drag-inducing portion(s) 850, the liquid in the flow is "split" and displaced by body of the drag-inducing portion(s) 850. As a result, a boundary layer may form along the surface(s) of the drag-inducing portion(s) 850. The boundary layer may result in the liquid changing in viscosity and becoming more dense (i.e., viscous diffusion). Liquid with such a change in viscosity and density may be convected downstream until the flow separates. Such a splitting of the flow path may additionally aid in the settling of particulates. The combination of splitting the flow and forcing direction changes may result in particulates being knocked or falling out of the vortex flow.

To effectively reduce the liquid flow velocity in the vortex and alter the flow path of liquid in the sump region 240, a plurality of drag-inducing portions 850, which project inwardly toward the central axis, may be positioned proximate the sidewall 205 of containment structure 200 in the sump region 240. The drag-inducing portions 850 may be attached to at least one supporting portion(s) 860, which may in turn be attached to the sidewall 205 of the sump region 240. The word attached may mean directly or indirectly attached, such as directly attached to the sidewall 205 of the sump region 240, or attached to the supporting portion 860, which are in turn attached to the sidewall 205 of the sump region 240. Attached also may mean attached by an adhesive or by means of a screw or bolt configuration (not shown). Lastly, attached may mean attached as a single formed and integrated piece. Alternatively, the plurality of drag-inducing portions 850 may be directly attached the sidewall 205 of the sump region 240.

The drag-inducing portion(s) 850 may comprise a substantially triangular shape. Substantially triangular may mean that the corners may be rounded, or that other small variations may exist. In one embodiment, the drag-inducing portion(s) 850 may comprise an isosceles right triangle shape. Other shapes are also possible—for example: rectangles; squares; ovals; circles; other triangles; or various other polygons. The exposed tip of each drag-inducing portion 850 pointing at least partially towards the central axis of the sump region 240 may be rounded.

Figure 8:
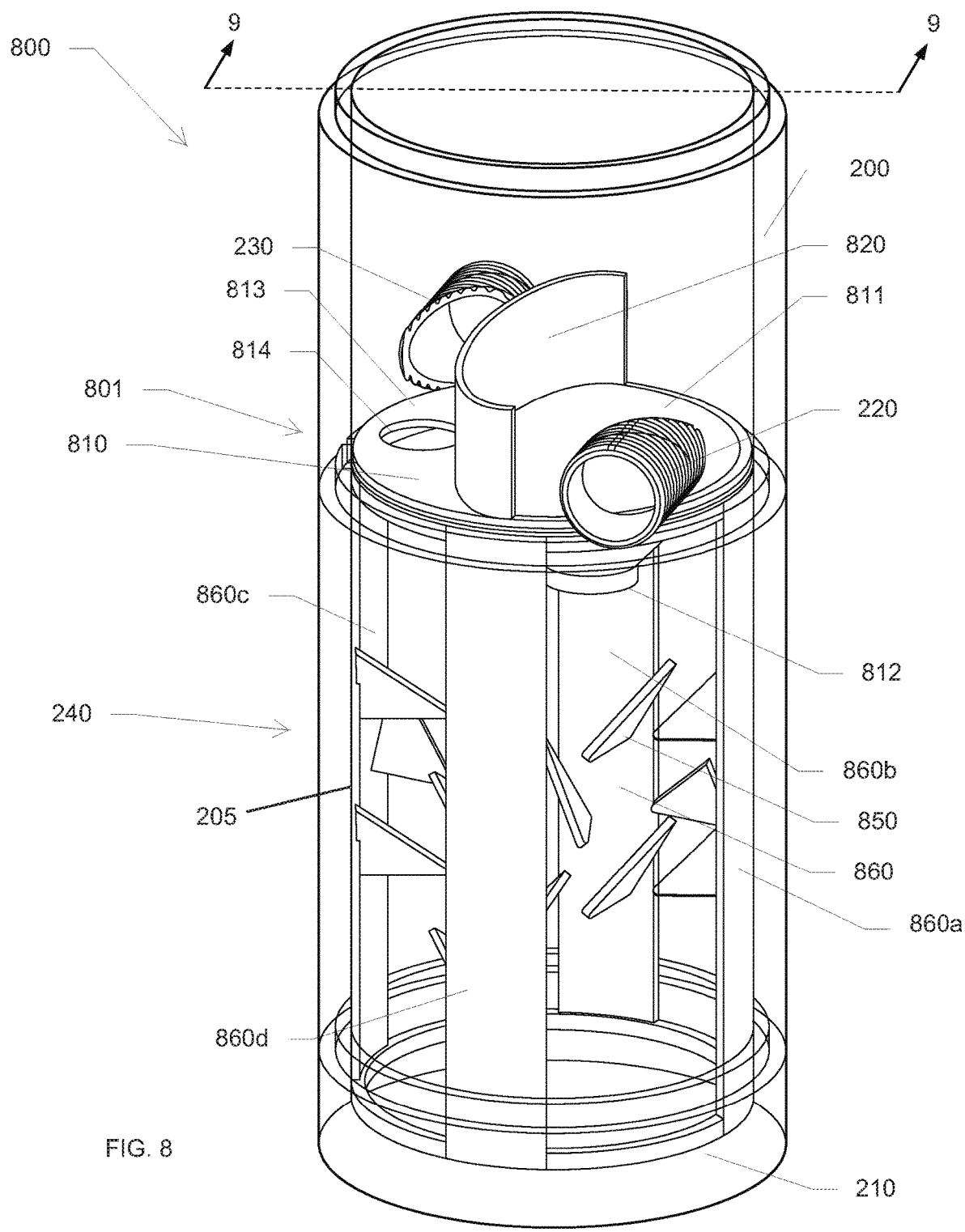
FIG. 8 illustrates liquid quality system including a plurality of drag-inducing portions attached to a supporting portion, according to certain inventive techniques.

As shown in FIGS. 8, 10, the supporting portion(s) 860 may comprise vertical strips (e.g., generally rectangular in shape) that may be positioned between the partitioning portion 810 and the base 210 proximate the sidewall 205 of containment structure 200 in the sump region 240. Moreover the plurality of supporting portion(s) 860 may be spaced equidistant around a perimeter of the sump region 240. A perimeter means proximate or on the sidewall 205 of containment structure 200 in the sump region 240. Alternatively, the plurality of supporting portion(s) 860 may be irregularly spaced around the perimeter of the sump region 240. The supporting portion(s) 860 may also comprise a different shape. For example, the drag-inducing portion(s) 850 may be attached to a circumferential supporting portion(s) 860 (e.g., a toroid) (not shown). Alternatively, the supporting portion(s) 860 could be triangular, square, oval, parallelogram, etc. and may be positioned equidistant or irregularly around the perimeter of the sump region 240. Moreover, the supporting portion(s) 860 may be attached to the sidewall 205 of the sump region 240. Additionally, the supporting portion(s) 860 may be integrated into the body of the containment structure 200, and/or partitioning portion 810, and/or base 210, or they may be separate pieces that work or connect together to achieve the functions described herein. A plurality of supporting portions 860 may be beneficial for efficient manufacture and installation.

One embodiment, as shown in FIGS. 8-10, may include a first drag-inducing portion 850*a*, a second drag-inducing portion 850*b*, and a third drag-inducing portion 850*c* (collectively drag-inducing portions), each of which may project inwardly toward the central axis and may be positioned proximate the sidewall 205 of containment structure 200 in the sump region 240. Four sets of the drag-inducing portions 850*a*, 850*b*, 850*c* may be respectively attached to a first supporting portion 860*a*, a second supporting portion 860*b*, a third supporting portion 860*c*, and a fourth supporting portion 860*d* (collectively, supporting portions), each of which may be may be positioned and/or attached proximate the sidewall of containment structure 200 in the sump region 240. The supporting portions 860*a*, 860*b*, 860*c*, and 860*d* may be positioned equidistant around the perimeter of the sump region 240. The vertical positioning of drag-inducing portions 850*a*, 850*b*, 850*c* may be generally central on each of the supporting portions 860*a*, 860*b*, 860*c*, and 860*d*. Other configurations are also possible. For example, more drag-inducing portions 850 and/or supporting portions 860 may be useful for larger diameter and/or taller sump regions 240. By contrast, fewer drag-inducing portions 850 and/or supporting portions 860 may be useful for smaller diameter and/or shorter sump regions 240. Additionally, the group of drag-inducing portions 850*a*, 850*b*, 850*c* may be positioned more towards the top or bottom on each of the supporting portions 860*a*, 860*b*, 860*c*, and 860*d*.

In one embodiment supporting portions 860*a* and 860*c*, may have a different configuration of drag-inducing portions 850*a*, 850*b*, 850*c*, than supporting portions 860*b* and 860*d*. In such an embodiment, the supporting portions 860*a* and 860*c* may face each other and have a first configuration and orientation of drag-inducing portions 850*a*, 850*b*, 850*c*. By contrast, the supporting portions 860*b* and 860*d* may still face each other, but they may comprise a second, different configuration and/or orientation of drag-inducing portions 850*a*, 850*b*, 850*c*.

Figures 13, 14:
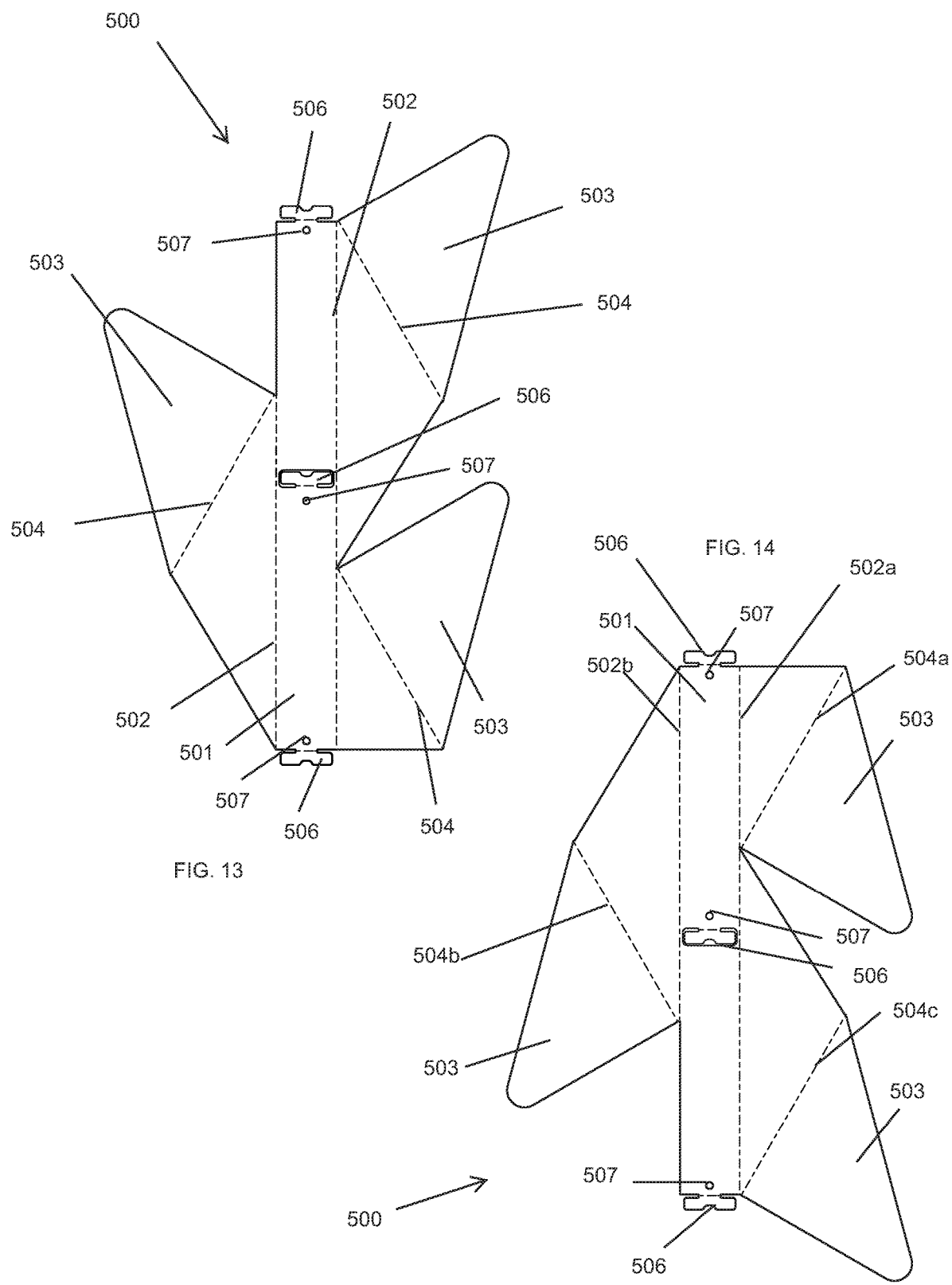
FIG. 13 illustrates a metal sheet pattern blank before it is folded into a plurality of drag-inducing portions according to certain inventive techniques.
FIG. 14 illustrates a metal sheet pattern blank before it is folded into a plurality of drag-inducing portions according to certain inventive techniques.

FIGS. 11 and 12, show example embodiments of drag-inducing portions 850 (including a first drag-inducing portion 850*a*, a second drag-inducing portion 850*b*, and a third drag-inducing portion 850*c*) made from a single piece of heavy gauge steel sheet. For example, as shown in FIGS. 13 and 14, the heavy gauge steel sheet may be cut into a pattern blank 500 having a spine 501 and one or more arms 503. The pattern blank 500 shown in FIGS. 13 and 14 is an example embodiment, and the present disclosure contemplates other patterns as well. For example, instead of having a triangular arms 503, the pattern could be rounded, rectangular, or any other shape. The pattern blank 500 may include a spine 501. The spine 501, may be a generally rectangular central portion of the pattern blank 500 from which one or more arms 503 extend. The pattern blank 500 may also include one or more inner bending lines 502 (shown in dashed line), positioned proximately on either side of the spine 501. The pattern blank may also include one or more outer bending lines 502 (shown in dashed line) positioned distally from the spine 501 on one or more of the arms 503.

In one embodiment, the example plurality of drag-inducing portions 850 as shown in FIGS. 11 and 12, the arm(s) 503 of the example pattern blank 500 as shown in FIGS. 13 and 14 may be bent to form one or more drag-inducing portions 850. Specifically, the pattern blank 500 of FIGS. 13 and 14 may be shaped into the drag-inducing portions 850 of FIGS. 11 and 12 by bending the arms 503 along the inner bending lines 502 and outer bending lines 504. Traditional metal bending techniques, for example using a metal press, may be used to bend the pattern blank 500.

For example, the pattern blank 500 may be bent along the inner bending line(s) 502 to form inner bend(s) 852 and inner arm portion 853. The angle of the inner bend 852 may vary with the diameter of the cylindrical containment structure 200 to ensure that the drag-inducing portion 850 does not interfere with the sidewall 205 of the containment structure when attached to the supporting portion 860. For example, in some embodiments, the inner bend 852 may have an angle of between 0 and 45 degrees. In one embodiment, the pattern blank 500 has a first inner bending line 502a and a second inner bending line 502b on either side of spine 501 and is bent twice to form a first inner bend 852a and a second inner bend 852b on either side of spine 851. In such an embodiment, the first inner bend 852a and second inner bend 852b may form one or more inner arm portion(s) 853. For example, a first inner arm portion 853a, a second inner arm portion 853b, and a third inner arm portion 853c. More or less inner arm portions 853 are also possible.

Likewise, the pattern blank 500 may be bent along the outer bending line(s) 504 to form outer bend(s) 854 and outer arm portions 855. The angle of the outer bend 854 may also vary with the diameter of the cylindrical containment structure 200 to ensure that the drag-inducing portion(s) are projecting towards a central axis. For example, in some embodiments, the outer bend 852 may have an angle of between 0 and 135 degrees. In a preferred embodiment, the angle of the outer bend 852 may be between 70 and 110 degrees. In one embodiment, the pattern blank 500 has a first outer bending line 504a, a second outer bending line 504b, and a third outer bending line 504c located respectively on inner arm portions 852a, 853b, and 853c. In such an embodiment, first outer bending line 504a, a second outer bending line 504b, and a third outer bending line 504c may be bent to form one or more outer arm portion(s) 855. For example, a first outer arm portion 855a, a second outer arm portion 855b, and a third outer arm portion 855c.

In the example described above, the first drag-inducing portion 550a may be formed of, and include the first inner bend 852a, the first inner arm portion 853a, the first outer bend 854a, and the first outer arm portion 855a. Likewise, the second drag-inducing portion 550b may be formed of, and include the second inner bend 852b, the second inner arm portion 853b, the second outer bend 854b, and the second outer arm portion 855b. Likewise, the third drag-inducing portion 550c may be formed of, and include the third inner bend 852c, the third inner arm portion 853c, the third outer bend 854c, and the third outer arm portion 855c.

In such an example, drag-inducing portions 850a, 850b, 850c may be equidistantly vertically positioned along a primary axial dimension. The drag-inducing portions 850a, 850b, 850c may also be irregularly vertically positioned along a primary axial dimension. The drag-inducing portions 850a, 850b, 850c may each be oriented generally upwardly (e.g., having a positive slope). The first drag-inducing portion 850(a) and the third drag-inducing portion 850(c) may be oriented in the same direction. For example, the first drag-inducing portion 850(a) and the third drag-inducing portion 850(c) may each be angled 60 degrees from a horizontal plane. The second drag-inducing portion 850(b) may have a mirrored orientation from the first drag-inducing portion 850(a) and the third drag-inducing portion 850(c). The second drag-inducing portion 850(b) may be angled 120 degrees from a horizontal plane. Smaller or larger positive angles are also possible for the orientation of the drag-inducing portions 850a, 850b, 850c in the first configuration.

In the second configuration, drag-inducing portions 850a, 850b, 850c may each be equidistantly vertically positioned along a primary axial dimension. The drag-inducing portions 850a, 850b, 850c may also be irregularly vertically positioned along a primary axial dimension. The drag-inducing portions 850a, 850b, 850c may each be oriented generally downwardly (e.g., having a negative slope as compared to those drag-inducing portions in the first configuration). The first drag-inducing portion 850(a) and the third drag-inducing portion 850(c) may be oriented in the same direction. For example, the first drag-inducing portion 850(a) and the third drag-inducing portion 850(c) may each be angled −60 degrees from a horizontal plane. The second drag-inducing portion 850(b) may have a mirrored orientation from the first drag-inducing portion 850(a) and the third drag-inducing portion 850(c). The second drag-inducing portion 850(b) may be angled −120 degrees from a horizontal plane. Smaller or larger negative angles are also possible for the orientation of the drag-inducing portions 850a, 850b, 850c in the second configuration.

The drag-inducing portions 850a, 850b, 850c in the first configuration (type 1) may be respectively vertically offset from the drag-inducing portions 850a, 850b, 850c in the second configuration (type 2) along a primary axial dimension as shown in FIG. 12. In one embodiment the second drag-inducing portion 850b of each the first supporting portion 860a and third supporting portion 860c may be located at the same or substantially the same vertical position along a primary axial dimension as the first drag-inducing portion 850a of each the second supporting portion 860b and fourth supporting portion 860d. Likewise, the third drag-inducing portion 850c of each the first supporting portion 860a and third supporting portion 860c may be located at the same or substantially the same vertical position along a primary axial dimension as the second drag-inducing portion 850b of each the second supporting portion 860b and fourth supporting portion 860d. During installation of the drag-inducing portions 850, the drag-inducing portions 850 may include visual markings to determine in which of the above configurations (type 1 or type 2) the individual drag-inducing portions 850 are to be installed.

Such an offset positioning of drag-inducing portions 850a, 850b, 850c between supporting portions 860a, 860b, 860c, and 860d may assisting in extending the length of the liquid flow path. For example, if the flow path is forced upward by the third drag-inducing portion 850c of the second supporting portion 860b or fourth supporting portion 860d, it may subsequently be forced downward by the third drag-inducing portion 850c of the first supporting portion 860a or fourth supporting portion 860c once the flow reaches there.

The angular position of the drag-inducing portions 850a, 850b, 850c may be based off the principles of Stoke's Law and "inclined plate settling" techniques. For example, in the embodiment in which the drag-inducing portions are positioned at a positive or negative 60 degree angle, the positioning of the drag-inducing portions 850 may help facilitate particulate settling. As previously discussed, particulate settling may be facilitated by increasing the length of the flow path, reducing the vortex velocities, and reducing the settling distance by directing relatively smooth, laminar flow towards the bottom of the sump region. An angular positioning of 60 degrees may also allow particulates to slide down the drag-inducing portion(s) 850 and fall to the bottom of the sump region. A higher degree angle may decrease the settling efficiency, while an angle less than 45 degrees may lead to particulate accumulation on the drag-inducing portions.

The size and orientation of the drag-inducing portions 850 may be chosen in assistance with the following equations:

$$t = \frac{w}{v\cos\theta}$$

$$L = \frac{w(V - v\sin\theta)}{v\cos\theta}$$

Where: w is the settling distance from the inlet orifice to the bottom of the sump region;
v is the settling velocity, in/s;
θ is the angle of the containment structure from horizontal; and
L is the length of the drag-inducing portions $$\frac{du_p}{dt} = F_D(u - u_p) + \frac{g_x(\rho_p - \rho)x^2}{\rho_p} + F_x$$

$$F_D = \frac{18\mu}{\rho_p d_p^2} \frac{C_D R_p}{24}$$

$$R_p = \frac{\rho d_p |u_p - u|}{u}$$

$$C_d = \frac{24}{R_p}$$

Where: $u_p$ is the particle velocity;
u is the fluid velocity;
ρ is the fluid density;
$\rho_p$ is the particle density;
$g_x$ is the gravity,
x and $F_x$ are additional forces such as body forces and forces due to pressure gradients; and
FD is the drag force being composed of the liquid molecular viscosity μ, the particle diameter $d_p$, the Reynolds number of the particle $R_p$ and the drag coefficient $C_d$.

The pattern blank 500 may also include one or more t-shaped patterns 501 cut in, or protruding from, the blank 500. One example may include three t-shaped patterns 506 integrally formed with the spine 501. In such an embodiment, both ends of the spine 501 may extend into a t-shaped pattern 506. Further, the third t-shaped pattern 506 may be cut into the spine 501 at a central position. Finally, the pattern blank 500 may include one or more aperture 507 cut at predetermined positions along the spine 501. One example may include cutting three apertures 507 into the spine 501, in which the apertures 507 are equidistantly vertically positioned along a primary axial dimension. The one or more t-shaped pattern(s) 506 may be bent in an opposite direction than the inner bend 852 or outer bend 854 to form t-shaped connecting portion(s) 856. In on example, the t-shaped pattern 506 is bent between 80 and 100 degrees. In a preferred embodiment, the t-shaped pattern 506 is bent 90 degrees so that the resulting t-shaped connecting portion 856 extends perpendicular to the spine 581.

FIGS. 15 and 16 show example drag-inducing portions 850 attached to a supporting portion 860. In one example, the supporting portion 860 includes a lower supporting portion 861 and an upper supporting portion 862. The lower supporting portion 861 and the upper supporting portion 862 may be a u-shaped rail. Other types of rails are also possible. The lower supporting portion 861 and the upper supporting portion 862 may be connected in a variety of ways including through use of fasteners, taper fit, interference fit, or friction fit. The lower supporting portion 861 and the upper supporting portion 862 may be shaped to allow the drag-inducing portion 850 to slide down the interior of the rail via the t-shaped connecting portion 856. The lower supporting portion 861 may also include one or more stopping portion(s) 864 (i.e., a positioning tab cut into lower supporting portion 861). The stopping portion(s) 864 may be spaced along a rear surface of the lower supporting portion 861. The stopping portion(s) 864 may be bent inwards into an interior of the lower connecting portion 861 to engage with (i.e., provide a shelf and positioning point) the drag-inducing portion via the lowest t-shaped connecting portion 856. The upper supporting portion 862 may include one or more locking portion(s) 865 (i.e., a locking tab cut into the upper supporting portion 862). The locking portions 865 may be spaced along a rear surface of the upper supporting portion 862. The locking portion(s) 865 may be slightly bent inwards into the interior of the upper supporting portion 862. In one embodiment, when the drag-inducing portion 850 is slid down the upper supporting portion 862 via the t-shaped connecting portion(s) 856, the locking portion(s) act as a spring and get pushed out of the way as the t-shaped connecting portion 856 passes. Once the t-shaped connecting portion 856 has passed, the locking portion 865 springs back into its original position effectively preventing the t-shaped connecting portion 856 from sliding back out of the upper supporting portion 862.

In the embodiment above, once the drag-inducing portion 850 is slid into the predetermined position (as set by the stopping portion 864) of the supporting portion 860, the drag-inducing portion may be effectively locked into place by the locking portion 865 (i.e., cannot be removed without deforming the locking portion 865). Additionally, the drag-inducing portion 850 may be further secured to the supporting portion 860 by conventional fastening techniques such as using a combination of bolts, washers, lock washers, and or luck nuts via the apertures 507.

Figure 17:
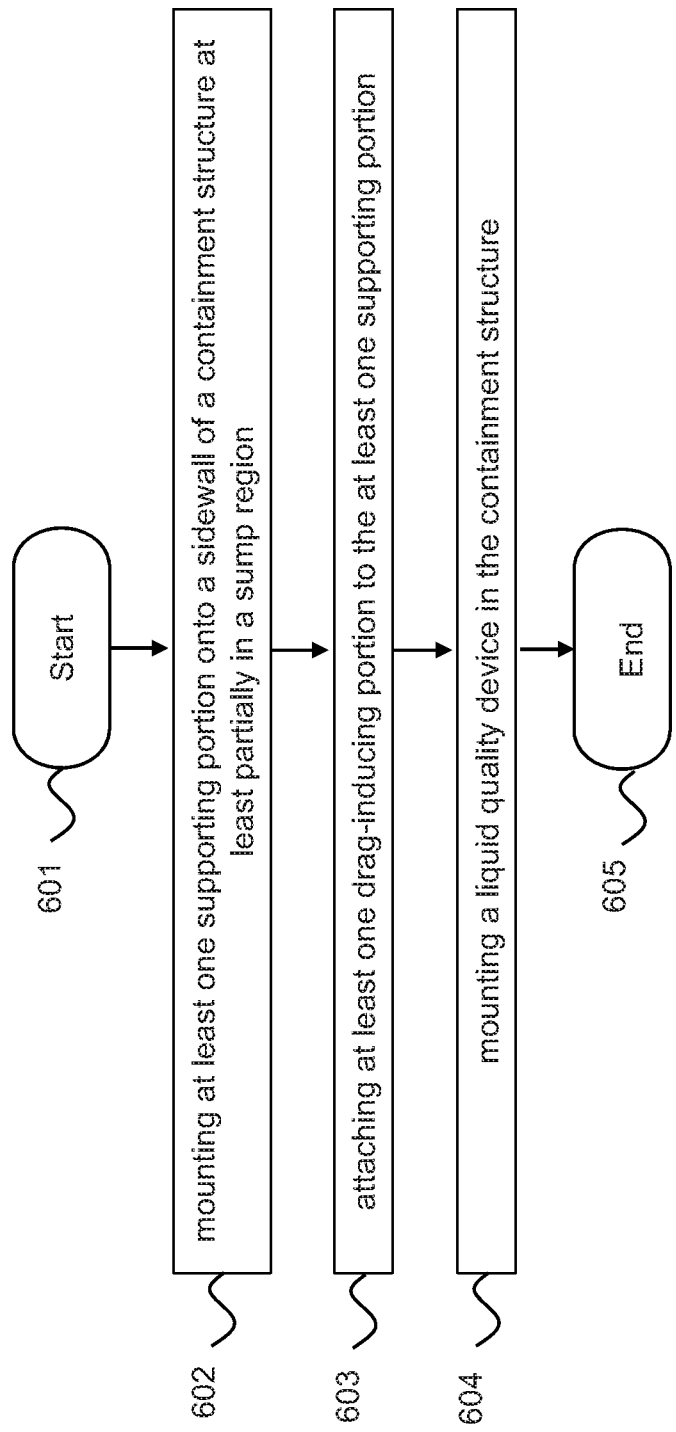
FIG. 17 is a flow chart illustrating example steps for installing liquid quality system including a liquid quality device and at least one drag-inducing assembly into a containment structure, wherein the at least one drag-inducing assembly includes at least one supporting portion and at least one drag-inducing portion, wherein when the liquid quality device is installed a sump region is formed below.

FIG. 17 is a flow chart illustrating example steps for installing a liquid quality system 800 including a liquid quality device 801 and at least one drag-inducing assembly 802 into a containment structure 200, wherein the at least one drag-inducing assembly 802 includes at least one supporting portion 860 and at least one drag-inducing portion 850, wherein when the liquid quality device 801 is installed a sump 240 region is formed below. Referring to FIG. 17, the example steps start at step 601. At step 602, at least one supporting portion 860 is mounted onto a sidewall 205 of the containment structure 200 at least partially in the sump region 240. At step 603, at least one drag-inducing portion 850 is attached to the at least one supporting portion 860. At step 604, a liquid quality device 801 is mounted in the containment structure 200. The example steps may proceed to the end step 605. It is to be understood that the present disclosure is not limited the specific order of steps 601 to 605—other orders are possible. Steps may also be performed in parallel.

Figure 18:
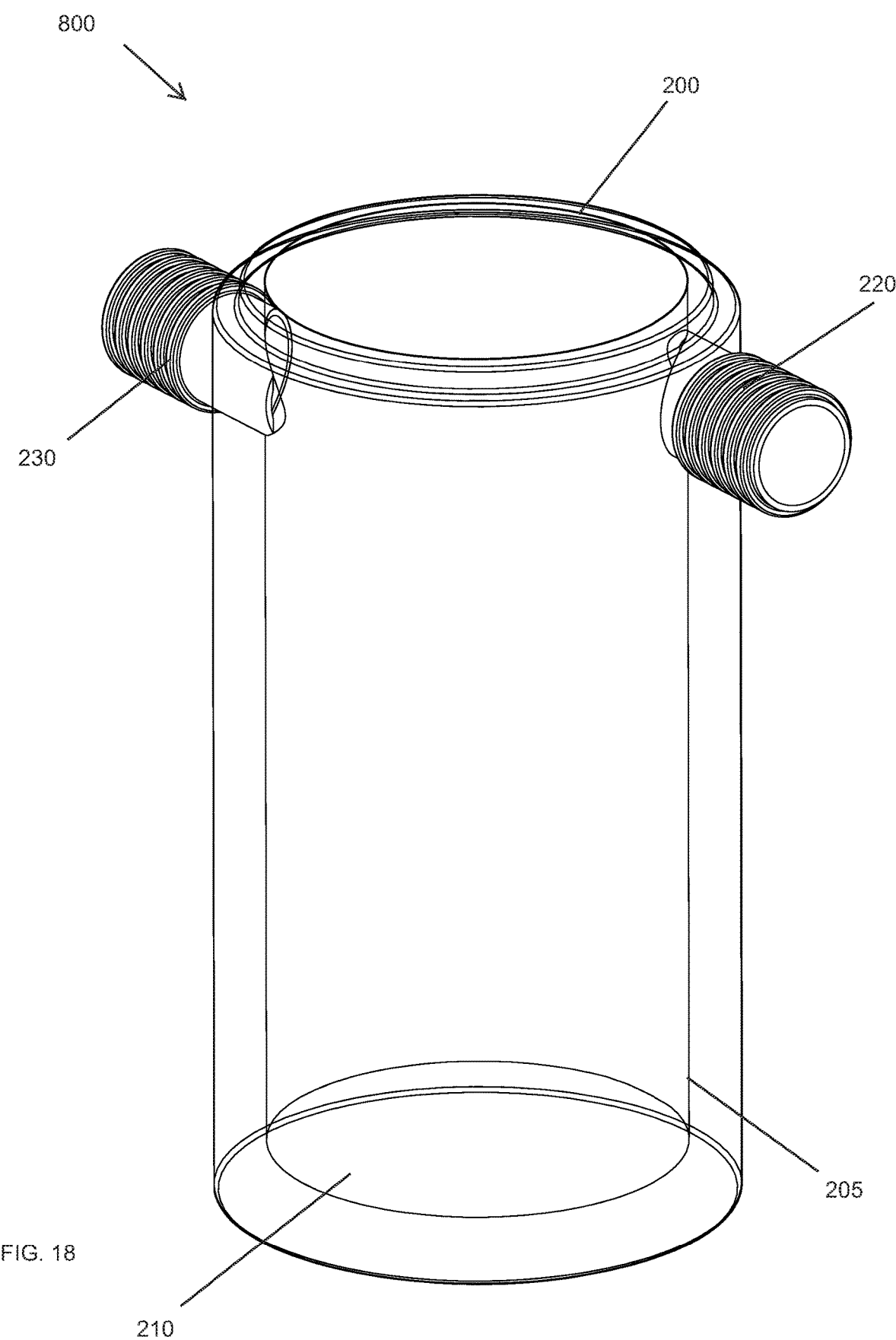
FIG. 18 illustrates an example step in the method showing a containment structure according to certain inventive techniques.
Figure 19:
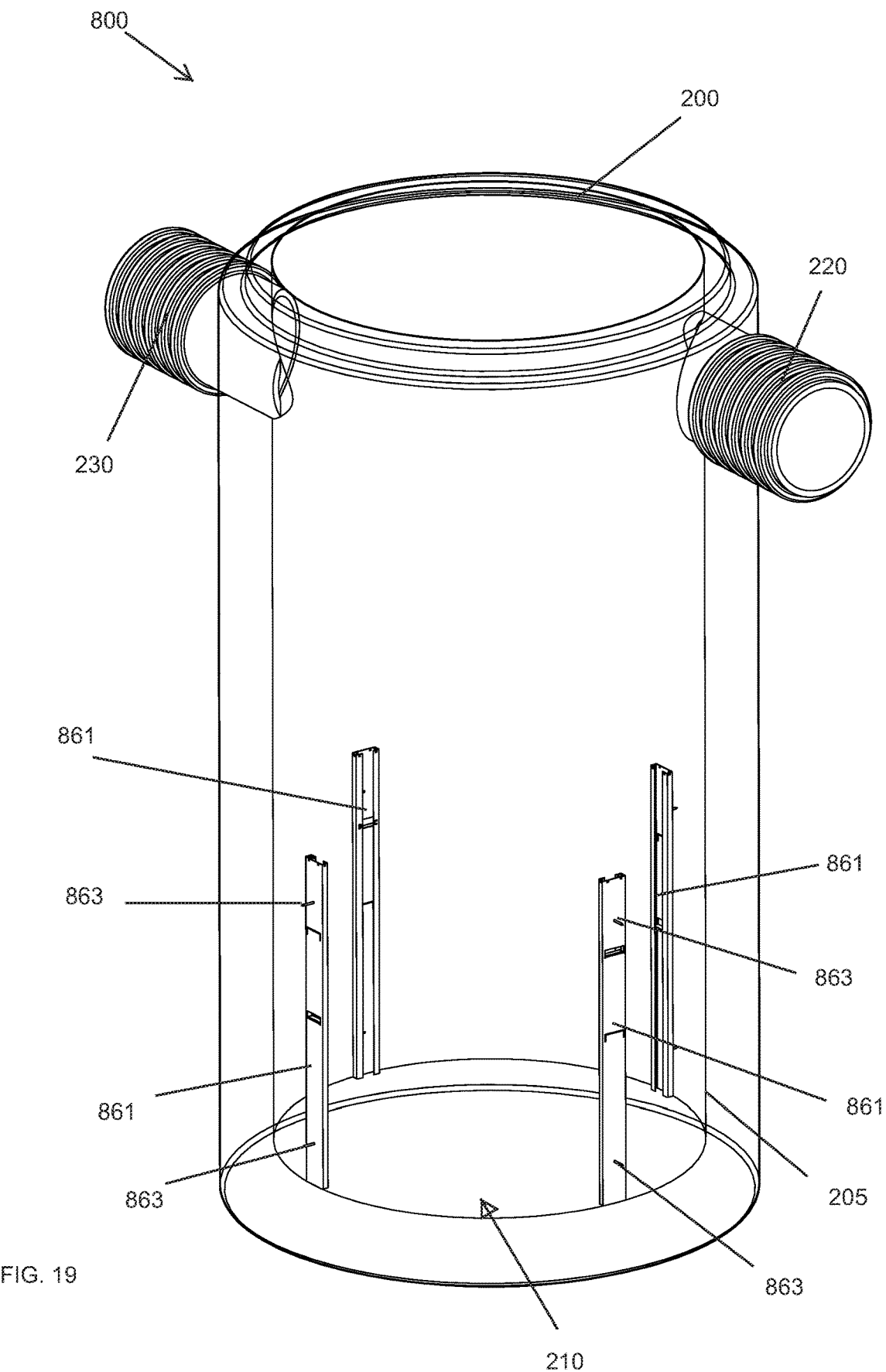
FIG. 19 illustrates an example step in the method showing a containment structure with plurality of lower supporting portions installed according to certain inventive techniques.
Figure 20:
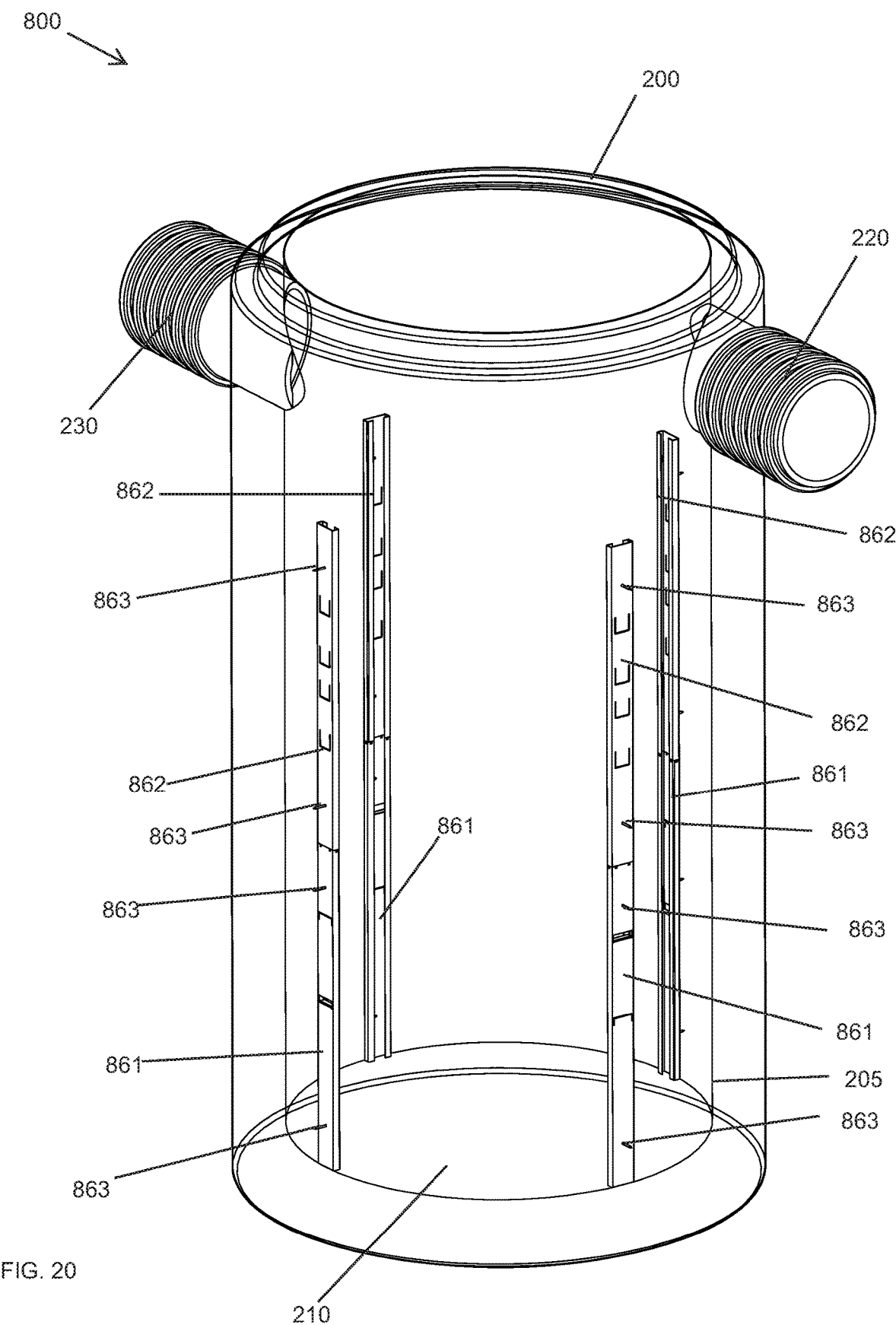
FIG. 20 illustrates an example step in the method showing a containment structure with plurality of lower supporting portions and a plurality of upper supporting portions installed according to certain inventive techniques.
Figure 23:
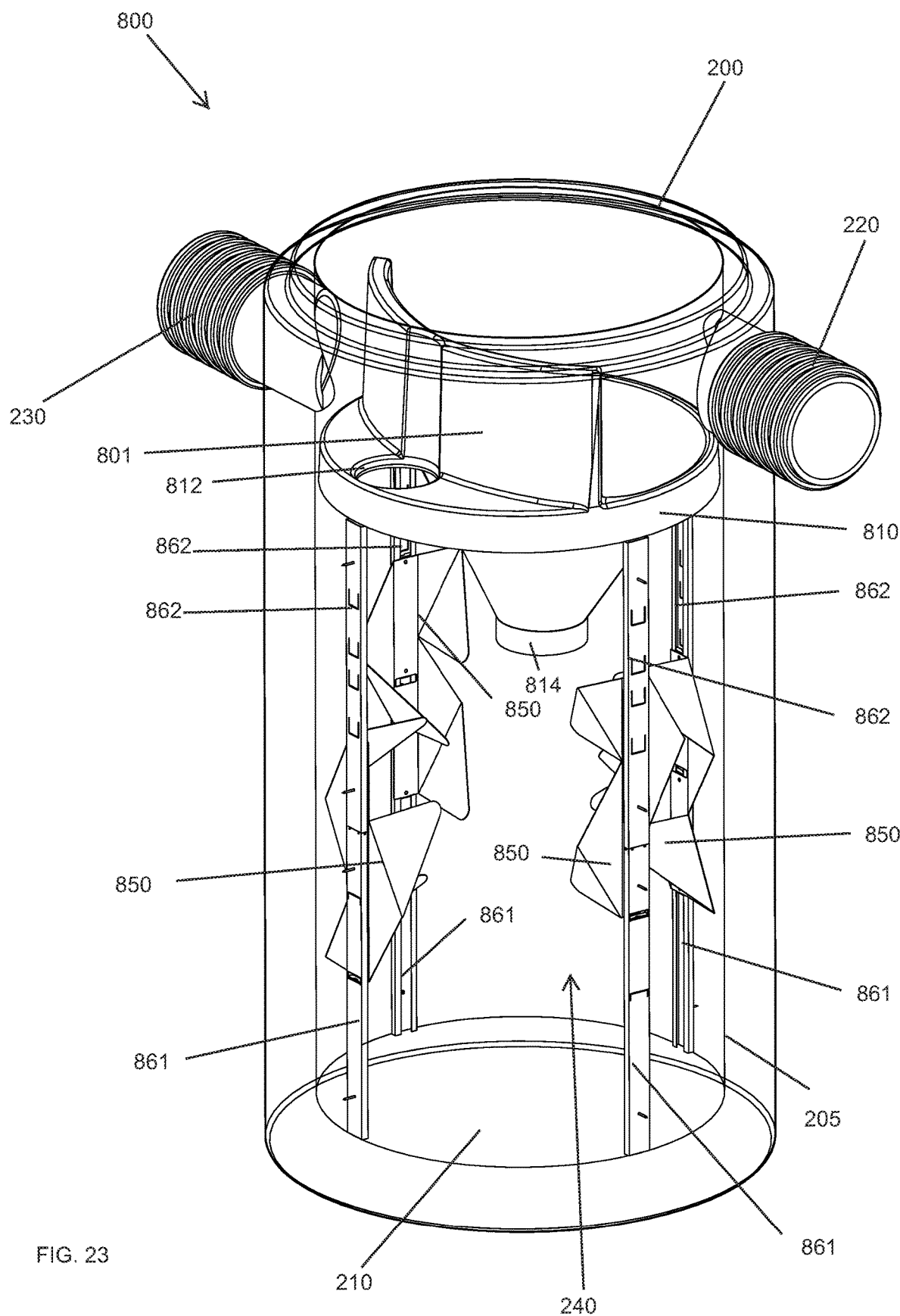
FIG. 23 illustrates an example step in the method showing a containment structure with plurality of lower supporting portions, a plurality of upper supporting portions, a plurality of drag-inducing portions, a plurality of caps, and a liquid quality device installed according to certain inventive techniques.

At step 602, for example as shown in FIGS. 18-20, at least one supporting portion 860 is mounted onto a sidewall 205 of the containment structure 200 (the containment structure 200 in FIGS. 28-23 is shown as transparent so that the internal components may be visible) at least partially in the sump region 240. The terms "mount" our "mounted" may refer to being fastened, attached, affixed, or secured to prevent movement between the part being mounted and the object to which the part is mounted. This may be done using conventional fasteners such as screws, bolts, nuts, or otherwise to secure one or more parts. Alternatively, mounted may mean being secured by means of an adhesive. Step 602 may include determining the location of the inlet 220 and outlet 240 of the containment structure 200 and marking the containment structure 200 with one or more vertical center lines (not shown). For example, in one embodiment four vertical centerlines (not shown) would be marked in the containment structure 200 to indicate the positions of four supporting portions 860. The step may further include indicating which type of drag-inducing portion 850 is to be installed on each supporting portion 860. For example, the drag-inducing portion 850, as discussed above, may be marked with letters indicating the whether it is a type 1 or type 2 drag-inducing portion 850. The supporting portion 860 may also be unique to the type of drag-inducing portion 850 that is to be attached to the supporting portion 860. Likewise, the supporting portion 860, may be marked to indicate with which type of drag-inducing portion 850 it is to be assembled. As discussed above, the supporting portions 860 (including lower supporting portion 861 and upper supporting portion 862) may include different locations of stopping portions 864 and locking portions 865 depending on the type of drag-inducing portion 860 that is to be installed. Alternatively, each of the drag-inducing portions 850 and supporting portions 860 may be the same.

In one example, four supporting portions 860, including a lower supporting portion 861 and an upper supporting portion 862 are installed in the containment structure 200. In such an example, the lower supporting portions 861 may be installed first by aligning the lower supporting portions 861 with the marked centerlines in the supporting structure 200. Such an example may further include positioning a lower region of the lower supporting porting on to the base 210 (i.e., the bottom of the lower supporting portion rests on the base 210 of the containment structure 200). The step 602 may further include checking that the lower supporting portions 861 are plumb vertical, making any necessary adjustments, and marking the location of the apertures 867 on the sidewall 205 of the containment structure 200. The step may further include removing the lower supporting portions 861 and drilling into the sidewall 205 of the containment structure 200 at the marked location of the apertures 867. In one example a Tapcon ³⁄₁₆" drill bit may be used to drill the holes. The step may also include re-positioning the lower supporting portions 861 at the marked centerlines and mounting the lower supporting portions 861 to the sidewall 205 via a fastener 863, such as screws, bolts, nuts, or otherwise. In one embodiment, Tapcon screws may be screwed into the pre-drilled holes, securing the lower supporting portions 861 to the sidewall 205 of the containment structure.

The upper supporting portions 862 may be installed in a similar manner as the lower supporting portions 861. The step may include positioning and mounting a lower region of the upper supporting portion 862 onto the upper region of the lower supporting portion 861 (i.e., the bottom of the upper supporting portion 862 may be configured to engage with the top of the lower supporting portion 861 via, for example with an interference fit, friction fit, taper fit, or some other type of mounting application). The step may further include checking that the upper supporting portion 862 is plumb vertical once the upper supporting portion 862 is mounted to the lower supporting portion 861, making any necessary adjustments, and marking the location of the apertures 867 on the sidewall 205 of the containment structure 200. The step may further include removing the upper supporting portions 862 and drilling the sidewall 205 of the containment structure 200 at the marked location of the apertures 867. The step may also include re-positioning the upper supporting portions 862 at the marked centerlines and mounting the upper supporting portions 862 to the sidewall 205 via a fastener 863, such as screws, bolts, nuts, or otherwise.

Figure 21:
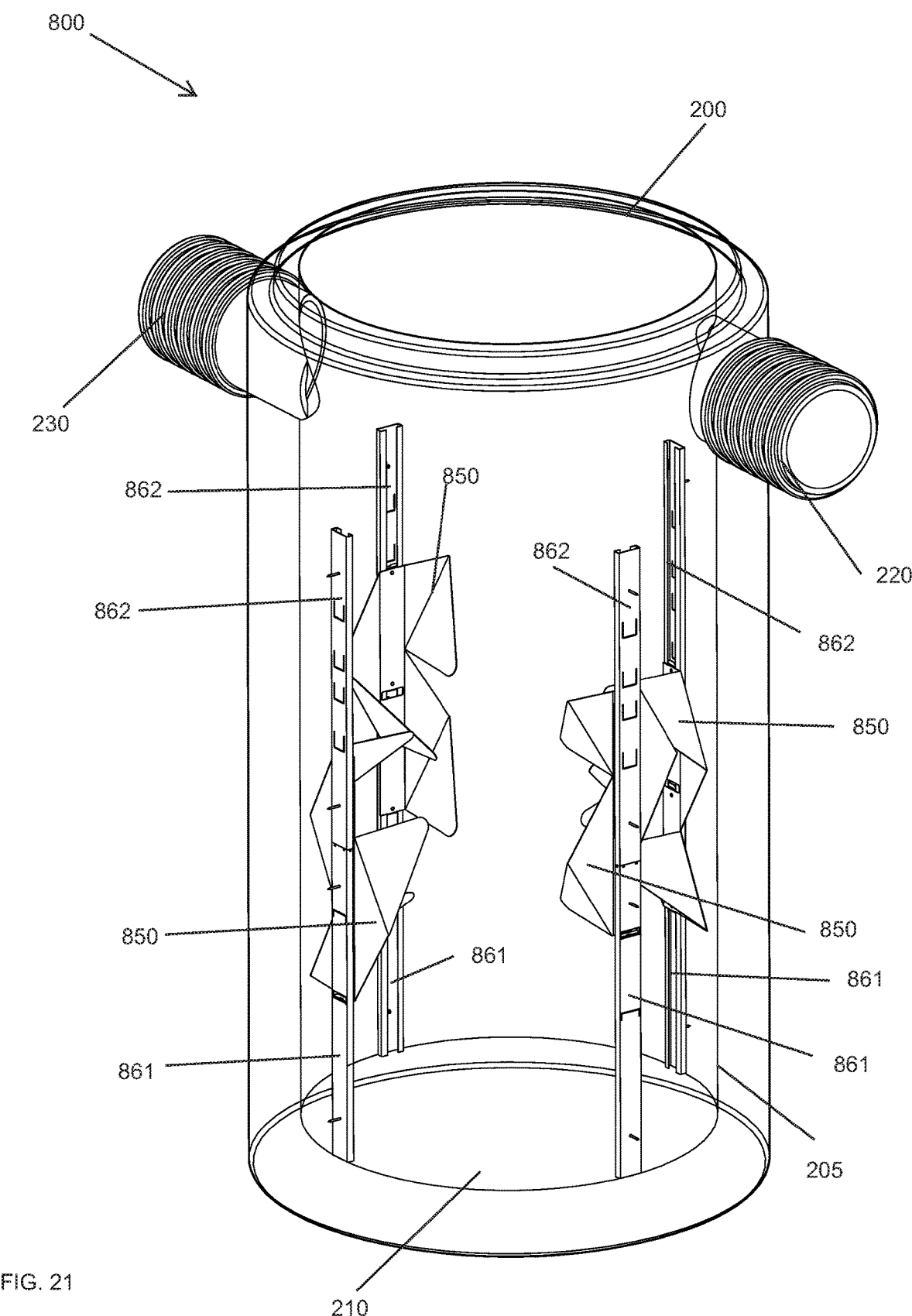
FIG. 21 illustrates an example step in the method showing a containment structure with plurality of lower supporting portions, a plurality of upper supporting portions, and a plurality of drag-inducing portions installed according to certain inventive techniques.

At step 603, for example as shown in FIG. 21, at least one drag-inducing portion 850 is attached to the at least one supporting portion 860. As discussed in detail above, the step may include sliding the drag-inducing portion 850 down the supporting portion 860 (in one example, the combined lower supporting portion 861 and upper supporting portion 862) via the T-shaped connecting portion(s) 856. The drag-inducing portion 850 may include markings indicating the direction it is to be installed. This step may include first positioning and engaging the lowest of the t-shaped connecting portions 856 at the an opening at the upper region of the upper supporting portion 862 (i.e., the open upper end of the u-shaped rail), and sliding drag-inducing portion 850 down the upper supporting portion 862 until a second and third t-shaped connecting portions 856 engage with the upper region of the upper supporting portion 862. More or less t-shaped connecting portions 856 are also contemplated. Once all t-shaped connecting portions 856 are engaged with the upper supporting portion 862, the entire drag-inducing portion 850 can be slid down the upper supporting portion 862, past any locking portions 865, onto the lower supporting portion, until the lowest of the t-shaped connecting portions 856 engages with the stopping portion 864 of the lower supporting portion 861 (i.e., the t-shaped connecting portion 856 hits the bent-in stopping portion 864, thereby preventing the drag-inducing portion from sliding any further down the lower supporting portion). Once the drag-inducing portion 850 is positioned via the stopping portion 864, one or more locking portions 855 may prevent the drag-inducing portion 850 from sliding back upwards out of the supporting portion 860 by interfering with the t-shaped connecting portions 856. The step may also include further mounting the drag-inducing portion 850 to the supporting portion 860 with a fastener (not shown) such as bolts, washers, lock washers, and or luck nuts via the apertures 507.

Figure 22:
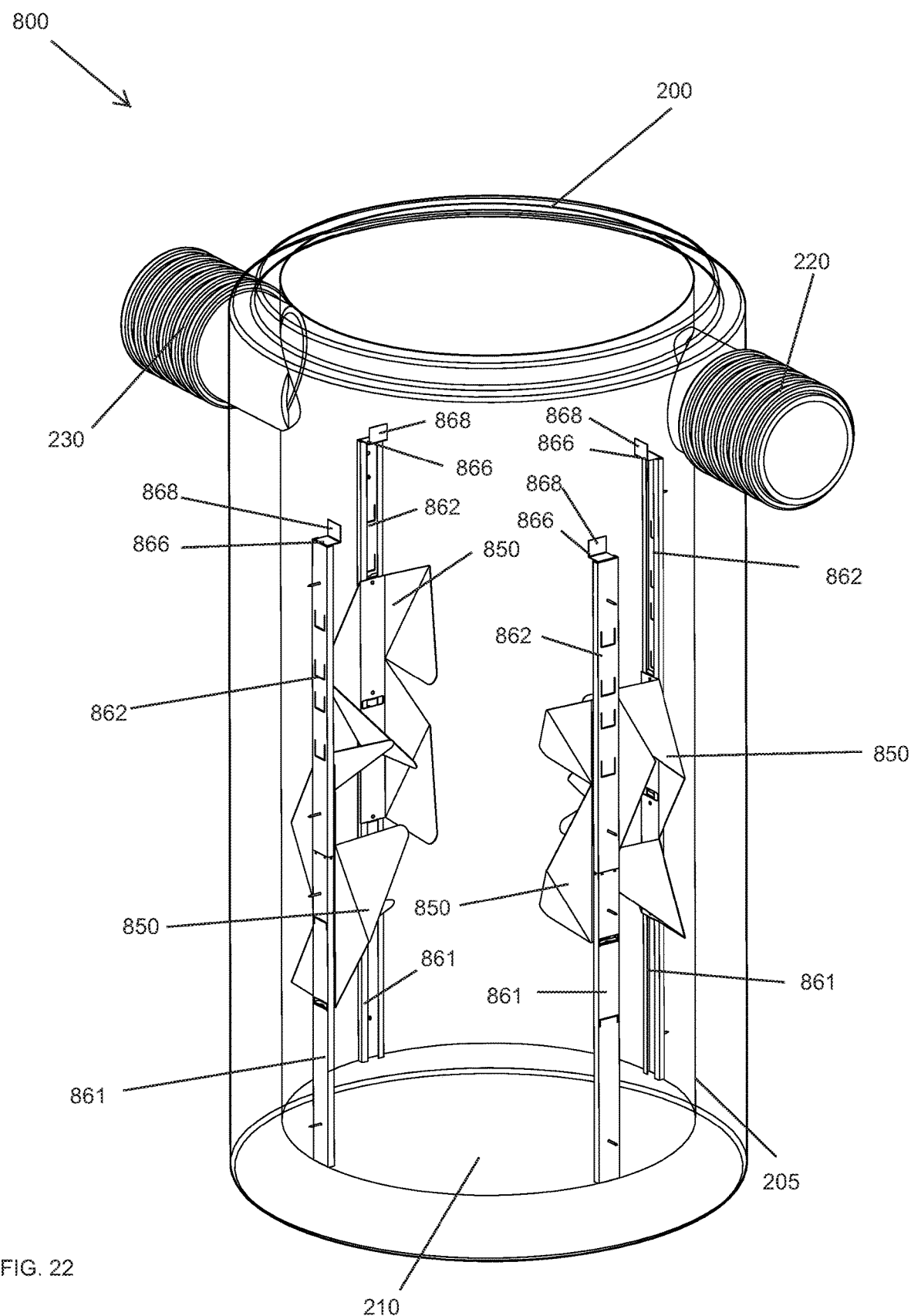
FIG. 22 illustrates an example step in the method showing a containment structure with plurality of lower supporting portions, a plurality of upper supporting portions, a plurality of drag-inducing portions, and a plurality of caps installed according to certain inventive techniques.

At step 604, for example as shown in FIGS. 22-23, a liquid quality device 801 is mounted in the containment structure 200. The step may include mounting a cap 866 to the upper region of the upper supporting portion 862 (i.e., the cap may be configured to engage with the top of the upper supporting portion 862 via, for example with an interference fit, friction fit, taper fit, or some other type of mounting application). The cap 866 may include a flange 868. In the example including four supporting portions 860, four caps 866 each having a flange 868 are mounted to respective supporting portions 860. The flanges 868 may effectively provide a shelf for the liquid quality device 801 to sit on. The step may further including positioning the liquid quality device 801 onto the flanges 868 and checking that the sump inlet aperture 812 is on the same side of the containment structure 200 as the inlet 230, and that the sump outlet aperture 814 is on the same side of the containment structure 200 as the outlet 230. Once the liquid quality device 801 is installed, a sump region 240 may be formed below in the containment structure 200. Finally, the step may include applying an adhesive (not shown) around a perimeter of the partitioning portion 810 of the liquid quality device 801 to mount the liquid quality device 801 to the containment structure 200 and one or more drag-inducing assemblies 802 via the flange 868. The term adhesive can include any type of glue, epoxy, resin, concrete, or other. In one example conseal may be wedged between the perimeter of the partitioning portion 810 of the liquid quality device 801 and the sidewall 205 of the containment structure 200 creating a seal to the sump region 240 formed below the liquid quality device 801.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A method for installing a liquid quality system into a containment structure, wherein the liquid quality system includes a liquid quality device and at least one drag-inducing assembly, wherein the at least one drag-inducing assembly includes at least one supporting portion and at least one drag-inducing portion, wherein when the liquid quality device is installed a sump region is formed below, wherein the at least one supporting portion comprises a lower supporting portion and an upper supporting portion, and the lower supporting portion is mounted onto the sidewall of the containment structure before the upper supporting portion is mounted onto the sidewall of the containment structure, wherein the lower supporting portion includes a lower region and an upper region, and the upper supporting portion includes a lower region and an upper region, the method comprising:
mounting, at least partially in the sump region, the at least one supporting portion onto a sidewall of the containment structure, further comprising positioning the lower region of the lower supporting portion onto a base of the containment structure, and mounting the lower region of the upper supporting portion to the upper region of the lower supporting portion;
attaching the at least one drag-inducing portion to the at least one supporting portion; and
mounting the liquid quality device in the containment structure.

2. The method of claim 1, further comprising:
attaching a cap including a flange to an upper region of the supporting portion; and
positioning the liquid quality device onto the flange.

3. The method of claim 2, further comprising applying adhesive to secure the liquid quality device to the sidewall of the containment structure and the drag-inducing assembly.

4. The method of claim 1, wherein the at least one drag-inducing portion comprises metal.

5. The method of claim 4, wherein the at least one drag-inducing portion comprises a plurality of drag-inducing portions constructed from a single piece of sheet metal.

6. The method of claim 5, further comprising:
cutting the piece of sheet metal into a pattern comprising a plurality of arms; and
bending each of the plurality of arms to from a plurality of drag-inducing portions.

7. The method of claim 6, wherein the plurality of drag-inducing portions comprises an inner bend, an inner arm portion, an outer bend, and an outer arm portion, wherein the inner bend and inner arm portion are proximate to a spine portion, and the outer bend and outer arm portion are distal from the spine portion.

8. The method of claim 1, wherein said attaching the at least one drag-inducing portion to the at least one supporting portion further comprises sliding the at least one drag-inducing portion along the supporting portion until the at least one drag-inducing portion contacts a stopping portion and is locked in place by a locking portion, thereby placing the at least one drag-inducing portion into a predetermined position.

9. A method for installing a liquid quality system into a containment structure, wherein the liquid quality system includes a liquid quality device and plurality of drag-inducing assemblies, wherein the plurality of drag-inducing assemblies includes at least one supporting portion and at least one drag-inducing portion, wherein when the liquid quality device is installed a sump region is formed below, the method comprising:
mounting, at least partially in the sump region, the at least one supporting portion of each of the plurality of drag-inducing assemblies onto a sidewall of the containment structure;
attaching the at least one drag-inducing portion of each of the plurality of drag-inducing assemblies to the at least one supporting portion; and
mounting the liquid quality device in the containment structure.

10. The method of claim 9, wherein the at least one supporting portion comprises a lower supporting portion and an upper supporting portion, and the lower supporting portion is mounted onto the sidewall of the containment structure before the upper supporting portion is mounted onto the sidewall of the containment structure.

11. The method of claim 10, wherein the lower supporting portion includes a lower region and an upper region, and the upper supporting portion includes a lower region and an upper region, and the method further comprises:
positioning the lower region of the lower supporting portion onto a base of the containment structure; and
mounting the lower region of the upper supporting portion to the upper region of the lower supporting portion.

12. The method of claim 9, further comprising:
attaching a cap including a flange to an upper region of the supporting portion; and
positioning the liquid quality device onto the flange.

13. The method of claim 12, further comprising applying adhesive to secure the liquid quality device to the sidewall of the containment structure and the drag-inducing assembly.

14. The method of claim 9, wherein the at least one drag-inducing portion comprises metal.

15. The method of claim 14, wherein the at least one drag-inducing portion comprises a plurality of drag-inducing portions made from a single piece of sheet metal.

16. The method of claim 15, further comprising:
cutting the piece of sheet metal into a pattern comprising a plurality of arms; and
bending each of the plurality of arms to from a plurality of drag-inducing portions.

17. The method of claim 16, wherein the plurality drag-inducing portions comprises an inner bend, an inner arm portion, an outer bend, and an outer arm portion, wherein the inner bend and inner arm portion are proximate to a spine portion, and the outer bend and outer arm portion are distal from the spine portion.

18. The method of claim 9, wherein said attaching the at least one drag-inducing portion of each of the plurality of drag-inducing assemblies to the at least one supporting portion comprises sliding the at least one drag-inducing portion along the supporting portion until the at least one drag-inducing portion contacts a stopping portion and is locked in place by a locking portion, thereby placing the at least one drag-inducing portion into a predetermined position.

* * * * *